United States Patent
Orita

(10) Patent No.: US 7,272,810 B2
(45) Date of Patent: Sep. 18, 2007

(54) SEMICONDUCTOR INTEGRATED CIRCUIT HAVING MULTI-LEVEL INTERCONNECTION, CAD METHOD AND CAD TOOL FOR DESIGNING THE SEMICONDUCTOR INTEGRATED CIRCUIT

(75) Inventor: Hiroshige Orita, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 480 days.

(21) Appl. No.: 11/019,922

(22) Filed: Dec. 20, 2004

(65) Prior Publication Data
US 2005/0160391 A1   Jul. 21, 2005

(30) Foreign Application Priority Data
Jan. 21, 2004   (JP)   ............ P2004-012894

(51) Int. Cl.
*G06F 17/50*   (2006.01)
(52) U.S. Cl. ................ 716/10; 716/5; 716/13
(58) Field of Classification Search ............ None
See application file for complete search history.

(56) References Cited

U.S. PATENT DOCUMENTS

| | | | | |
|---|---|---|---|---|
| 5,404,310 A | * | 4/1995 | Mitsuhashi | 716/13 |
| 5,537,328 A | * | 7/1996 | Ito | 716/1 |
| 6,058,257 A | * | 5/2000 | Nojima | 716/12 |
| 6,405,354 B1 | * | 6/2002 | Itazu et al. | 716/8 |
| 6,675,139 B1 | * | 1/2004 | Jetton et al. | 703/17 |
| 6,794,674 B2 | * | 9/2004 | Kusumoto | 327/524 |
| 7,016,794 B2 | * | 3/2006 | Schultz | 702/64 |
| 7,155,684 B2 | * | 12/2006 | Kusumoto | 716/1 |

FOREIGN PATENT DOCUMENTS

JP   2002-151592   5/2002

* cited by examiner

*Primary Examiner*—Leigh M. Garbowski
(74) *Attorney, Agent, or Firm*—DLA Piper US LLP

(57) ABSTRACT

A computer-aided design method of an integrated circuit includes: calculating current dissipation consumed by logic elements, in a ladder network embracing a plurality of current paths connected between subject first- and second-potential-level power supply wiring; analyzing a tolerable electro-migration current of the subject first-potential-level power supply wiring; analyzing an interval voltage drop between a control point and a specific position on the subject first-potential-level power supply wiring; and comparing a summation of through-currents flowing the logic elements from the control point to the specific point, with the tolerable electro-migration current, and comparing the interval voltage drop with a tolerable voltage drop to determine an optimum location of a via configured to supply power from the subject first-potential-level power supply wiring to the logic elements.

20 Claims, 21 Drawing Sheets

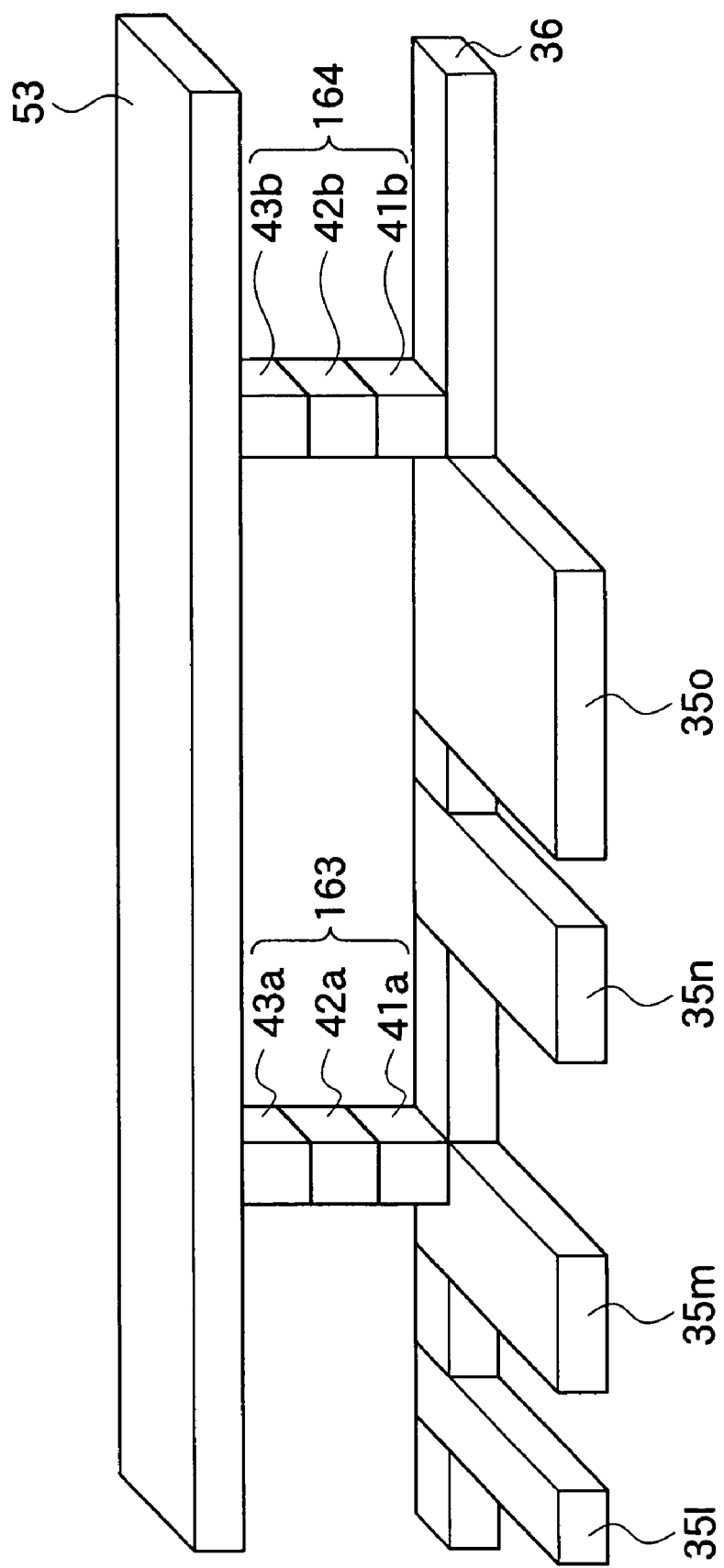

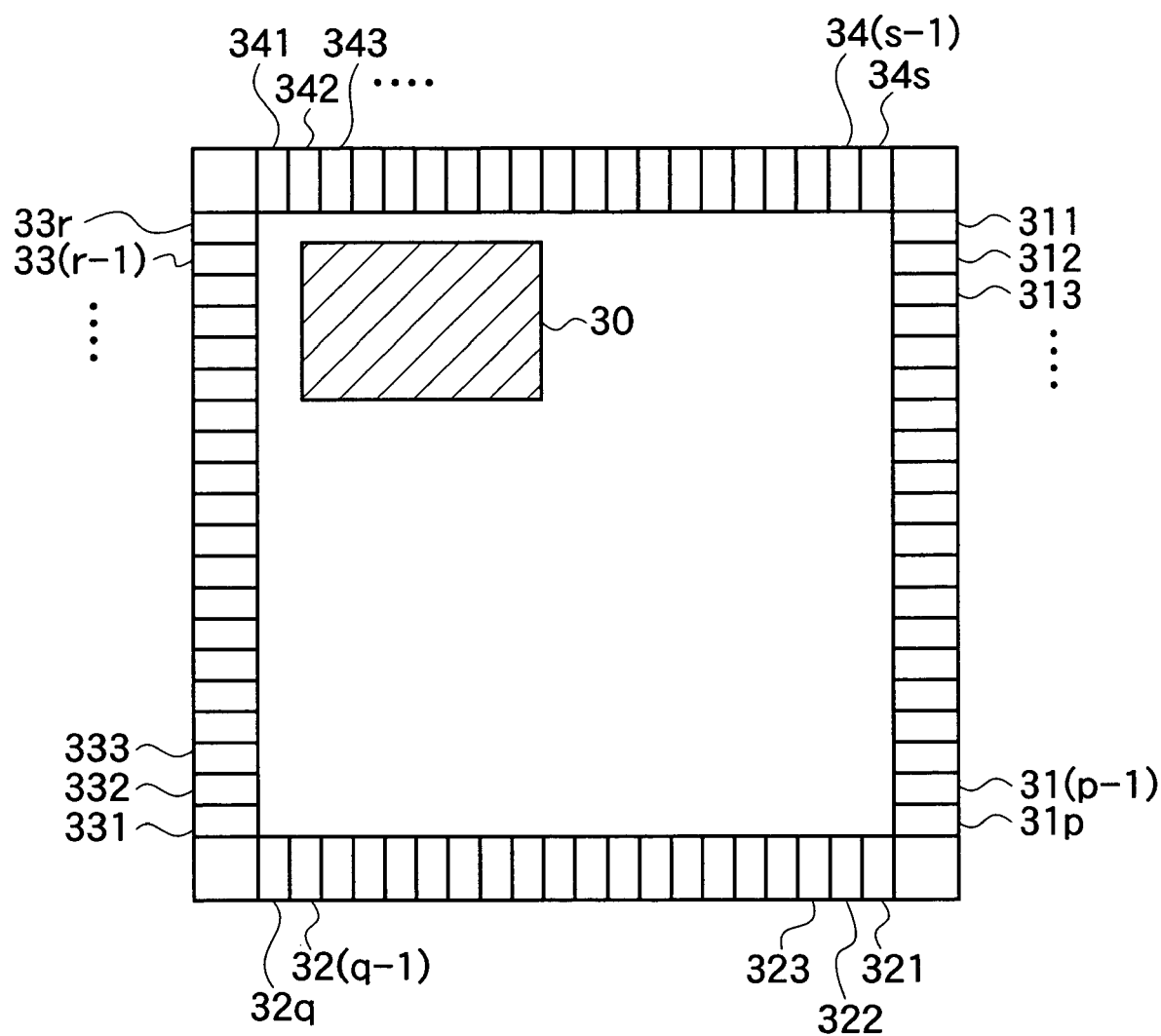

SEMICONDUCTOR INTEGRATED CIRCUIT HAVING MULTI-LEVEL INTERCONNECTION, CAD METHOD AND CAD TOOL FOR DESIGNING THE SEMICONDUCTOR INTEGRATED CIRCUIT

CROSS REFERENCE TO RELATED APPLICATIONS AND INCORPORATION BY REFERENCE

This application claims benefit of priority under 35 USC 119 based on Japanese Patent Application No. P2004-12894 filed Jan. 21, 2004, the entire contents of which are incorporated by reference herein.

BACKGROUND OF THE INVENTION

1. Field of the Invention

The present invention relates to a computer-aided design (CAD) method and a CAD tool executing the CAD method. It is particularly related to the CAD method and the CAD tool of a semiconductor integrated circuit having a multi-level interconnection, with a plurality of logic cells and power supply wirings that supply the logic cells with electric power, and a semiconductor integrated circuit manufactured with mask patterns designed by the CAD method and the CAD tool.

2. Description of the Related Art

In earlier technology, along each side of a silicon chip, or a single crystal substrate (semiconductor chip) cut into a rectangular geometry in a plan view, multiple of chip-site bonding pads (external input/output terminals) are arranged so as to implement a semiconductor integrated circuit, which adopts a mesh architecture for a power supply system. Inside the array of chip-site bonding pads, input/output buffer cells (I/O cells) are arranged corresponding to the array of chip-site bonding pads at the periphery of the semiconductor chip. The central portion of the semiconductor chip surrounded by the input/output buffer cells is defined as "a logic element arrangement region" for placing macrocells (functional blocks) having logic or memory functions and/or logic cells (logic elements).

Horizontal power supply wirings and vertical power supply wirings are arranged so as to form a mesh topology in the logic element arrangement region, supplying power to the macrocells and/or the logic cells. Horizontal power supply wirings in a subject wiring level crisscross with vertical power supply wirings disposed in an upper or lower wiring level of the subject wiring level so as to implement a multi-level interconnection architecture.

For example, a structure of a five level interconnection can be implemented by a first high-potential power supply wiring extending along the X direction in a first wiring level, or in the lowest level, a second high-potential power supply wiring extending along the Y direction in a second wiring level, a third high-potential power supply wiring extending along the X direction in a third wiring level, a fourth high-potential power supply wiring extending along the Y direction in a fourth wiring level and a fifth high-potential power supply wiring extending along the X direction in a fifth wiring level, or in the upper most level. In the five level interconnection, power is supplied from the fifth high-potential power supply wiring to the fourth high-potential power supply wiring, the third high-potential power supply wiring, the second high-potential power supply wiring in order and finally to the first high-potential power supply wiring. Then power is supplied from the fifth high-potential power supply wiring to the logic cell (logic element).

The interlevel between the fifth high-potential power supply wiring and the fourth high-potential power supply wiring is electrically connected through a via-hole (or through-hole) penetrating an interlevel insulator formed between the fifth and fourth high-potential power supply wirings. Similarly, each of the interlevels is electrically connected through a via-hole between the fourth and third high-potential power supply wirings, between the third and second high-potential power supply wirings, between the second and first high-potential power supply wirings.

In general, in earlier CAD technology for designing semiconductor integrated circuits, implemented by such mesh architecture, power supply wirings are allocated uniformly in the whole area of the logic element arrangement region. Therefore, as current dissipation increases, due to the advance of performance and the increase of the number of logic cells in a semiconductor integrated circuit, the number of power supply wirings tends to increase. Then, as the performance of semiconductor integrated circuits improves and the degree of on-chip integration increases, the real estate, or the area of the arrangement region (routing space) of signal wirings routing the macrocells and the logic cells (logic elements), etc. decreases, and wiring efficiency of the signal wirings decreases.

In earlier physical designs of semiconductor integrated circuits based upon mesh architecture, an analysis process of electro-migration immunity and voltage drop of power supply wirings is performed, after the placement process of the power supply wirings, the macrocells, the logic cells (logic elements) etc. And, as a result of the analysis process, a supplemental power supply wiring is added if sufficient electro-migration immunity is not obtained or voltage drop exceeds a tolerable value. Also after macrocells, logic cells (logic elements), power supply wirings etc. were placed and completing a layout design, there arose a case where improvements in operation timing and circuit change etc. are required, so that engineering change order (ECO) must be executed. Owing to the execution of the ECO, by which the addition and/or resizing of a logic cell (logic element) may be conducted, current dissipation increases in a localized part of the semiconductor integrated circuit, and a further supplemental power supply wiring must be added.

However, addition of such supplemental power supply wiring is difficult, because routing process of clock signal wirings and other signal wirings is already finished in a semiconductor integrated circuit of a mesh architecture. For example, when a supplemental power supply wiring must be added, in order to prevent electrical short circuit failure between the supplemental power supply wiring and clock signal wirings or between the supplemental power supply wiring and other signal wirings, the clock signal wirings and other signal wirings may be required to be moved. And when the clock signal wirings and other signal wirings are moved, change of operation timing is generated. That is to say, a technical problem occurs such that, to some extent, redesign of the layout is inevitable in advanced semiconductor integrated circuits.

In view of the technical problem, a semiconductor integrated circuit implemented by a stacked-via architecture is developed. In the semiconductor integrated circuit implemented by the stacked-via architecture, a plurality of chip-site bonding pads (external input/output terminals) are arranged along each side of a semiconductor chip, similar to the layout of the semiconductor integrated circuit implemented by the mesh architecture. Then, within the array of chip-site bonding pads (external input/output terminals), input/output buffer cells are arranged. In the stacked-via architecture, the central portion surrounded by input/output buffer cells is the logic element arrangement region, in which a macrocell, having a logic function and/or a memory function, and logic cells (logic elements) are placed.

For example, consider the multi-level interconnection of five wiring levels, in which power is supplied from an upper high-potential power supply wiring of a fifth wiring level to a lower high-potential power supply wiring of a first wiring level through a stacked-via so that the power can be supplied to logic elements arranged in the logic element arrangement region of the semiconductor integrated circuit. To describe the stacked-via architecture, for example, suppose that the lower high-potential power supply wiring in the first wiring level extends along the X direction and that the upper high-potential power supply wiring in the fifth wiring level extends along the X direction, identical direction of the lower high-potential power supply wiring. Then, a stacked-via penetrates the triple interlevel insulators between the lower high-potential power supply wiring and the upper high-potential power supply wiring so that the lower high-potential power supply wiring and the upper high-potential power supply wiring can be electrically connected by the stacked-via. Therefore, the stacked-via may encompass a lowest via-plug of the second wiring level, a middle via-plug of the third wiring level disposed on the lowest via-plug and an upper via-plug of the fourth wiring level disposed on the middle via-plug. Namely, the stacked-via is implemented by vertically accumulating the lowest via-plug, the middle via-plug and the upper via-plug at identical position in a plan view.

However, physical design of a semiconductor integrated circuit implemented by the stacked-via architecture has following new problems:

(i) After vias were uniformly arranged in the whole area of the logic element arrangement region, a macrocell and logic cells (logic elements), etc. are placed actually, and then logic functions and memory functions are constructed by the macrocell and logic cells (logic elements), etc. But, because there is a considerable distance between a central portion of the logic element arrangement region and an I/O cell position for power supply, a resistance component of power supply wirings becomes so large in the central portion of the logic element arrangement region that the current is highly dissipated in the power supply wirings. Therefore, in the central portion, the power supply quantity is insufficient, and the drop of supply voltage is easily generated. In the meantime, in a crowded area where logic elements are packed in the logic element arrangement region, since the current dissipation by the logic elements is large, the power supply quantity from the stacked-vias is insufficient, and the drop of supply voltage is easily generated.

(ii) Consequently, in the above-stated crowded area of the logic cells (logic elements), because the number of allocated stacked-vias becomes relatively insufficient, excess current larger than the tolerable current for a single stacked-via easily flows in each of stacked-vias. Therefore, electro-migration is easily generated in the stacked-vias.

(iii) Since the stacked-vias are uniformly allocated in the whole area of the logic element arrangement region, in an area where logic cells (logic elements) are sparsely allocated with small allocation number of the logic cells (logic elements), the stacked-vias are allocated excessively larger than the required allocation number of the stacked-vias. Therefore, routing process of the signal wirings is restricted by the excessive stacked-vias and wiring efficiency decreases, disturbing the performance improvement, and the enhancement of high integration of the semiconductor integrated circuit becomes difficult.

SUMMARY OF THE INVENTION

An aspect of the present invention inheres in a computer-aided design method of multilevel interconnection including first- and second-potential-level power supply wirings for supplying power to a plurality of logic elements in an integrated circuit. That is, the method encompasses: calculating current dissipation consumed by the logic elements, in a ladder network comprising a plurality of current paths flowing through each of the logic elements, the current paths are connected in parallel between a subject first-potential-level power supply wiring and a subject second-potential-level power supply wiring; analyzing a tolerable electro-migration current of the subject first-potential-level power supply wiring; analyzing an interval voltage drop between a control point and a specific position on the subject first-potential-level power supply wiring; and comparing a summation of through-currents flowing the logic elements, which are arranged in a region from the control point to the specific point, with the tolerable electro-migration current, and further comparing the interval voltage drop with a tolerable voltage drop so as to determine an optimum location of a via configured to supply power from the subject first-potential-level power supply wiring to the logic elements.

Another aspect of the present invention inheres in a designing tool of an integrated circuit having a multilevel interconnection including first- and second-potential-level power supply wirings for supplying power to a plurality of logic elements, encompassing: a current dissipation calculation module configured to calculate current dissipation consumed by the logic elements, in a ladder network comprising a plurality of current paths flowing through each of the logic elements, the current paths are connected in parallel between a subject first-potential-level power supply wiring and a subject second-potential-level power supply wiring; an electro-migration analysis module configured to analyze a tolerable electro-migration current of the subject first-potential-level power supply wiring; a voltage drop analysis module configured to analyze an interval voltage drop between a control point and a specific position on the subject first-potential-level power supply wiring; and a via allocation calculation module 135 configured to compare a summation of through-currents flowing the logic elements, which are arranged in a region from the control point to the specific point, with the tolerable electro-migration current, and further compare the interval voltage drop with a tolerable voltage drop so as to calculate an optimum location of a via configured to supply power from the subject first-potential-level power supply wiring to the logic elements.

Still another aspect of the present invention inheres in an integrated circuit, encompassing: a plurality of logic elements merged in a semiconductor chip; an interlevel insulator disposed above the logic elements; a subject first-potential-level power supply wiring extending along a fixed direction in a subject wiring level disposed above the interlevel insulator, configured to supply power to the logic elements; a subject second-potential-level power supply wiring in second subject wiring level disposed above the interlevel insulator, being paired with and running in parallel with the subject first-potential-level power supply wiring; and a via allocated in a specific position on the subject first-potential-level power supply wiring, configured to supply the power from the subject first-potential-level power supply wiring to the logic elements, the specific position is determined such that a summation of through-currents flowing the logic elements, which are arranged in a region from a control point to the specific point is smaller than a tolerable electro-migration current, and that an interval voltage drop of the subject first-potential-level power supply wiring from the control point to the specific point is smaller than a tolerable voltage drop.

BRIEF DESCRIPTION OF THE DRAWINGS

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as it is conventional in the representation of semiconductor integrated circuit, it will be appreciated that the various drawings are not drawn to scale from one figure to another nor inside a given figure, and in particular that the layer thicknesses are arbitrarily drawn for facilitating the reading of the drawings.

FIG. 4 is a schematic perspective view showing stacked-vias formed between subject and lower first-potential-level power supply wirings (high-potential power supply wirings) according to the first embodiment of the present invention;

FIG. 7 is a plan view illustrating a floorplan layout in the computer-aided design method of the first embodiment, in which I/O cells are placed in peripheral zone of a chip area and a macrocell is placed at left and upper corner area of a logic element arrangement region surrounded by the I/O cells;

DETAILED DESCRIPTION OF THE INVENTION

In the following description specific details are set forth, such as specific materials, process and equipment in order to provide a thorough understanding of the present invention. It will be apparent, however, to one skilled in the art that the present invention may be practiced without these specific details. In other instances, well-known manufacturing materials, process and equipment are not set forth in detail in order not to unnecessary obscure the present invention. Prepositions, such as "on", "over", "under", "beneath", and "normal" are defined with respect to a planar surface of the substrate, regardless of the orientation in which the substrate is actually held. A layer is on another layer even if there are intervening layers.

FIRST EMBODIMENT

Figure 1:
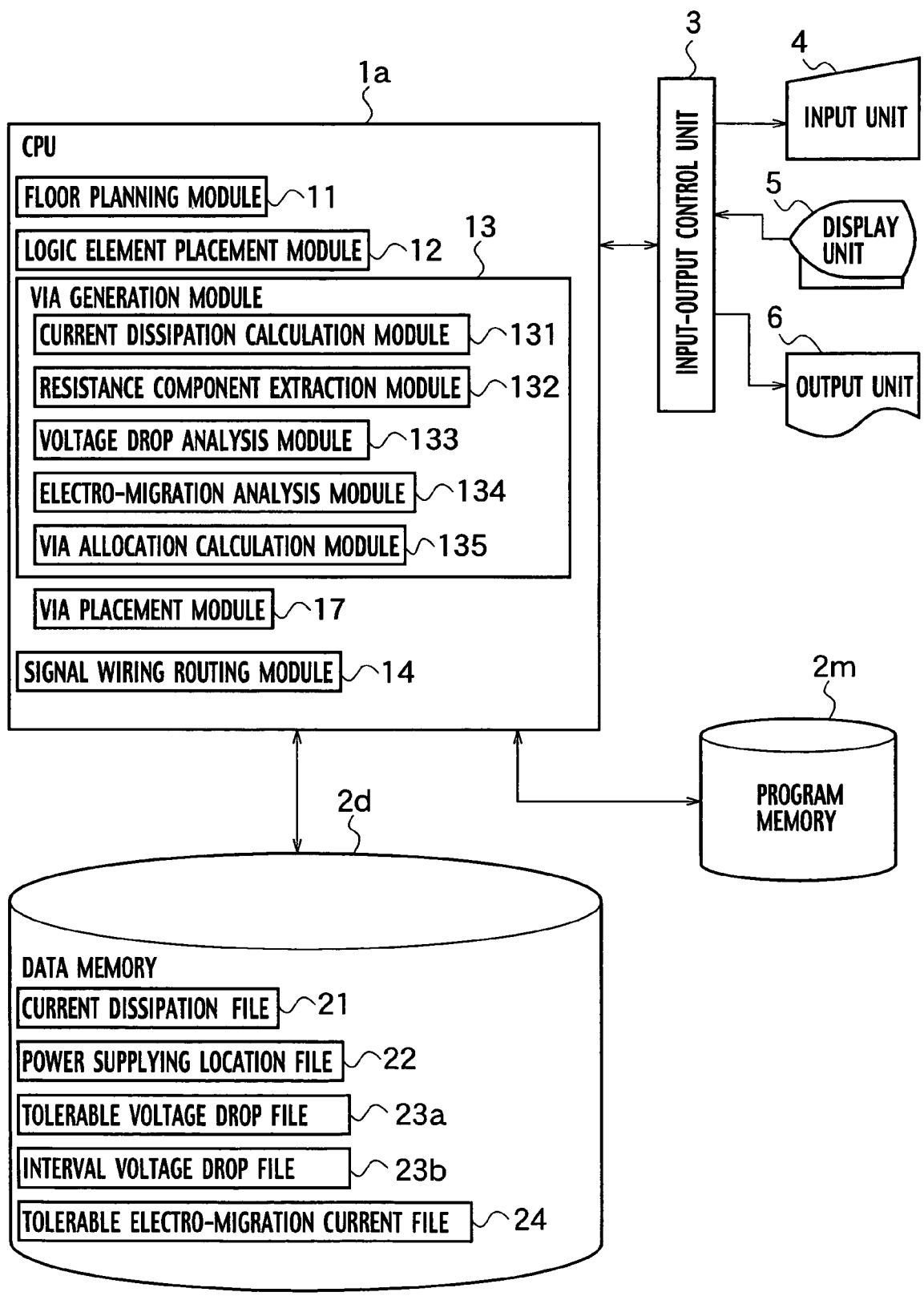
FIG. 1 is a schematic view showing an organization of a designing tool according to a first embodiment of the present invention.

As shown in FIG. 1, a designing tool according to a first embodiment of the present invention is a computer system encompassing a input unit 4 configured to accept input data and instructions from an operator, a central processing unit (CPU) 1a configured to control and perform various operations of layout design, etc., an output unit 6 configured to provide layout results, etc., a display unit 5 configured to display input data, intermediate data and output data including the result of layout design, a data memory 2d configured to store various data necessary for layout design of a semiconductor integrated circuit, etc. and a program memory 2m configured to store layout design program of a semiconductor integrated circuit, etc.

The designing tool of the first embodiment further encompasses an input/output control unit 3. Through the input/output control unit 3, the input unit 4, the output unit 6 and the display unit 5 are connected to the CPU 1a.

The CPU 1a has a floor-planning module 11 configured to design floorplan layout, a logic element placement module 12 configured to place logic elements, a via generation module 13 configured to generate vias so that the problem of electro-migration and voltage drop do not occur, a signal wiring routing module 14 configured to route the signal wirings and a via placement module 17 configured to place vias.

Figure 2:
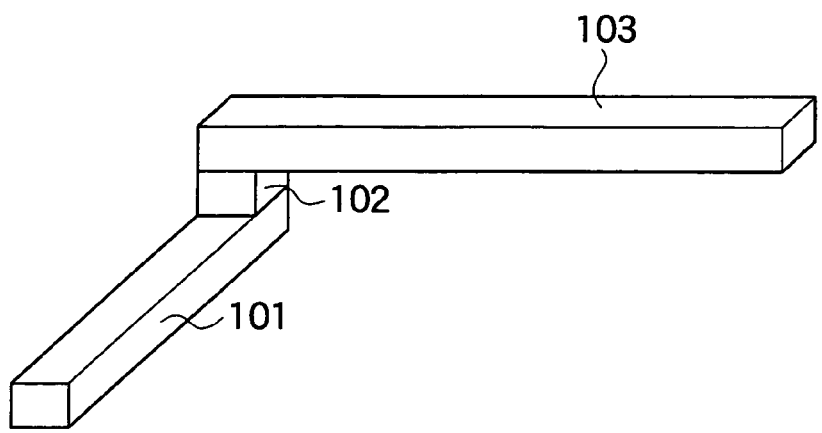
FIG. 2 is a schematic perspective view showing a structure of a single cut via, which will be employed in first to fourth embodiment of the present invention.
Figure 3A:
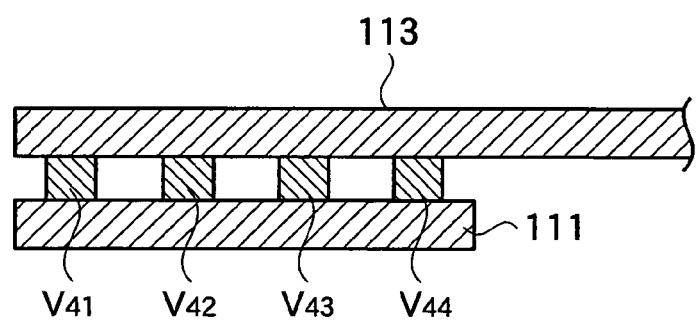
FIG. 3A is a schematic cross sectional view showing a structure of a multi-cut via, which will be employed in first to fourth embodiments of the present invention, taken on line III-III in FIG. 3B.
Figure 3B:
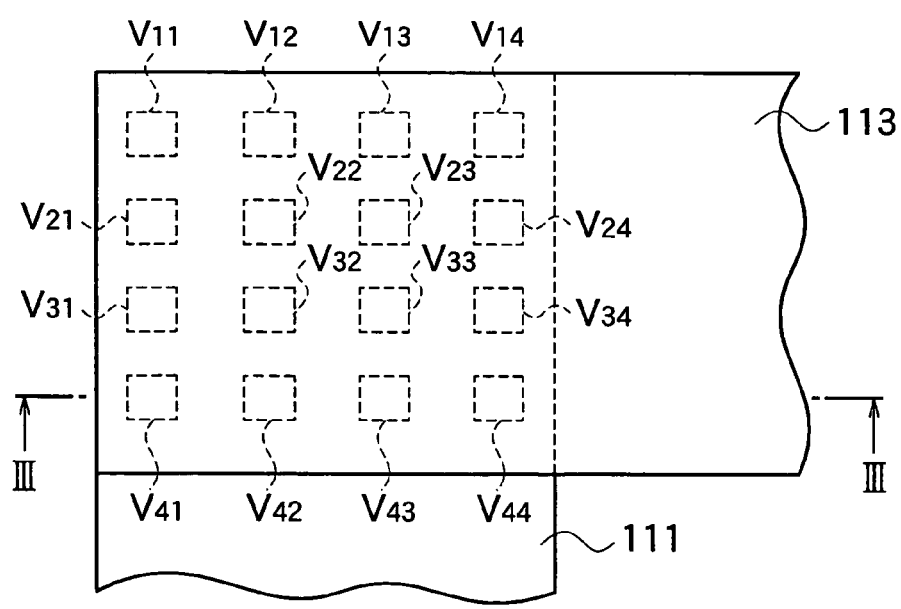
FIG. 3B is a plan view corresponding to the schematic cross sectional of FIG. 3A, showing the structure of the multi-cut via.
Figure 5:
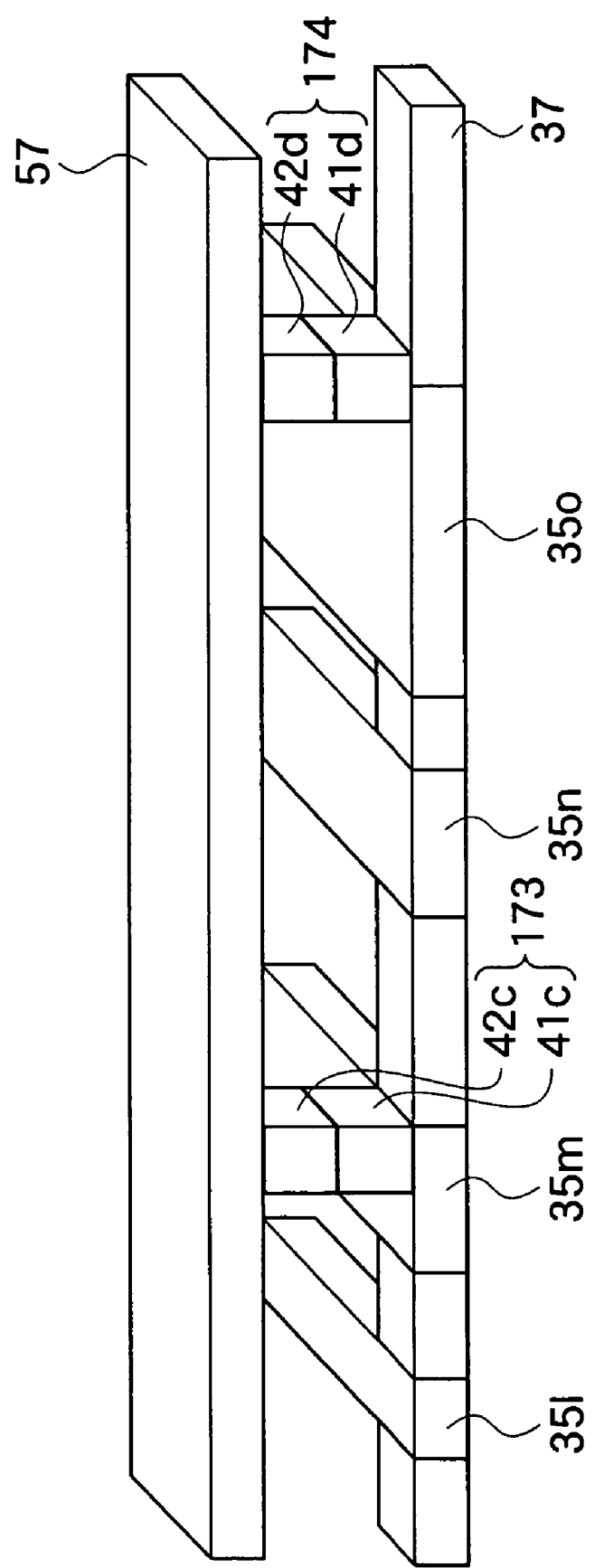
FIG. 5 is a schematic perspective view showing another stacked-vias formed between subject and lower second-potential-level power supply wirings (low-potential power supply wirings) according to the first embodiment of the present invention.

The via generation module 13 calculates optimum locations of the vias and places the vias to the optimum locations so as to generate a plurality of vias including a single cut via 102 shown in FIG. 2, a multi-cut via $V_{ij}$ (i=1-4, j=1-4) shown in FIG. 3B and stacked-vias 163, 164, 173 and 174 shown in FIGS. 4 and 5.

In FIG. 2, an upper wiring 103 extending along X-direction in the $q^{th}$ wiring level and a lower wiring 101 extending along Y-direction in the $(q-1)^{th}$ wiring level are connected by a single cut via 102 ("q" is an integer equal to or larger than 2). "The single cut via" is a connection with only one via-plug between the subject and lower wirings. The connection of the single cut via is defined at one location between the subject and lower wirings.

In FIGS. 3A and 3B, an upper wide wiring 113 extending along X-direction in the $k^{th}$ wiring level and a lower wide wiring 111 extending along Y-direction in the $(k-1)^{th}$ wiring level are connected by a plurality of vias $V_{ij}$s, each having a standard size ("k" is an integer equal to or larger than 2; "i" and "j" are integers from one to four, each representing a position in a matrix). "The multi-cut via" is a configuration of connections that has a plurality of connection vias between the subject and lower wirings. Since employment of a big via having a larger area is prohibited by the requirement of the manufacturing process, the contact resistance between the wiring 113 of the $k^{th}$ wiring level and the wiring 111 of the $(k-1)^{th}$ wiring level is so designed to be decreased by a plurality of via $V_{ij}$s of standard size.

In FIG. 4, the lower first-potential-level (high-potential) power supply wiring 36 in the first wiring level extends along the X direction and the subject first-potential-level (high-potential) power supply wiring 53 in the fifth wiring level extends along the X direction, identical direction of the lower first-potential-level (high-potential) power supply wiring 36. Then, stacked-vias 163 and 164 penetrate quadruple interlevel insulators between the lower first-potential-level power supply wiring 36 and the subject first-potential-level power supply wiring 53 so that the lower first-potential-level power supply wiring 36 and the subject first-potential-level power supply wiring 53 can be electrically connected by the stacked-vias. Namely, the stacked-via 163 encompasses a lowest via-plug 41a of the second wiring level, a middle via-plug 42a of the third wiring level disposed on the lowest via-plug 41a and an upper via-plug 43a of the fourth wiring level disposed on the middle via-plug 42a. And, the stacked-via 164 encompasses a lowest via-plug 41b of the second wiring level, a middle via-plug 42b of the third wiring level disposed on the lowest via-plug 41b and an upper via-plug 43b of the fourth wiring level disposed on the middle via-plug 42b. That is, the stacked-via 163 is implemented by vertically accumulating the lowest via-plug 41a, the middle via-plug 42a and the upper via-plug 43a at an identical position in a plan view, and the stacked-via 164 is implemented by vertically accumulating the lowest via-plug 41b, the middle via-plug 42b and the upper via-plug 43b at another identical position in a plan view so that the subject first-potential-level power supply wiring 53 of the fifth wiring level and the lower first-potential-level power supply wiring 36 of the first wiring level can be connected by the stacked-vias 163 and 164. Through the lower first-potential-level power supply wiring 36, a plurality of logic elements 35l, 35m, 35n and 35o are supplied with electric power. "The stacked-via" realizes a connection between the subject and lower wirings by laminating a plurality of via-plugs, each having a height corresponding to a wiring level thickness.

In FIG. 5, the lower second-potential-level (low-potential) power supply wiring 37 in the first wiring level extends along the X direction and the subject second-potential-level (low-potential) power supply wiring 57 in the fourth wiring level extends along the X direction, identical direction of the lower second-potential-level (low-potential) power supply wiring 37. Then, stacked-vias 173 and 174 penetrate triple interlevel insulators between the lower second-potential-level power supply wiring 37 and the subject second-potential-level power supply wiring 57 so that the lower second-potential-level power supply wiring 37 and the subject second-potential-level power supply wiring 57 can be electrically connected by the stacked-vias. Namely, the stacked-via 173 encompasses a lower via-plug 41c of the second wiring level and an upper via-plug 42c of the third wiring level disposed on the lower via-plug 41c. And, the stacked-via 174 encompasses a lower via-plug 41d of the second wiring level and an upper via-plug 42d of the third wiring level disposed on the lower via-plug 41d. That is, the stacked-via 173 is implemented by vertically accumulating the lower via-plug 41c and the upper via-plug 42c at an identical position in a plan view, and the stacked-via 174 is implemented by vertically accumulating the lower via-plug 41d and the upper via-plug 42d at another identical position in a plan view so that the subject second-potential-level power supply wiring 57 of the fourth wiring level and the lower second-potential-level power supply wiring 37 of the first wiring level are connected by the stacked-vias 173 and 174. Through the lower second-potential-level power supply wiring 37, a plurality of logic elements 35l, 35m, 35n and 35o are supplied with electric power.

By various vias such as the single cut via, the multi-cut via $V_{ij}$ and the stacked-vias 163, 164, 173, 174, electric power can be directly supplied through the lowest level power supply wirings to the logic elements 35l, 35m, 35n and 35o from the upper level power supplying layer.

The logic element placement module 12 places a plurality of logic elements in the logic element arrangement region established in the chip area. The logic element placement module 12 further places a subject first-potential-level (high-potential) power supply wiring in a subject wiring level, the subject first-potential-level power supply wiring supplies the power supply voltage to the target logic elements through a lower first-potential-level (high-potential) power supply wiring, the subject wiring level is a wiring level different from the level in which the target logic elements are placed. The subject first-potential-level power supply wiring extends along a fixed direction in the subject wiring level. The logic element placement module 12 further places the lower first-potential-level power supply wiring in a wiring level under the subject wiring level, the lower first-potential-level power supply wiring supplies the power supply voltage to the target logic elements. The lower first-potential-level power supply wiring extends along the same direction as the subject first-potential-level power supply wiring. Furthermore, the logic element placement module 12 places a subject second-potential-level (low-potential) power supply wiring in second subject wiring level, being paired with and running in parallel with the subject first-potential-level power supply wiring, and a lower second-potential-level (low-potential) power supply wiring extending along the same direction as the subject second-potential-level power supply wiring in a wiring level under the second subject wiring level.

The term "chip area" defines a unit area to be cut as a semiconductor chip in assembly process, in which the semiconductor chip is assembled into a package. Generally, a plurality of chip areas are assigned in a matrix topology on a circular semiconductor wafer. Because the exposure field of the exposure system, or the projection printer is only a fraction of the semiconductor wafer surface, a unit chip area corresponding to the exposure field is stepped and repeated over the whole wafer to completely expose the whole wafer by the exposure system. Then, the space between the chip areas adjacently assigned in the matrix topology defines a dicing lane. Through the dicing lane, each of the semiconductor wafers is cut and separated into smaller dice called as "semiconductor chips".

The floor-planning module 11, the logic element placement module 12, the via generation module 13 and the signal wiring routing module 14 etc. provided in the CPU 1a may be implemented by exclusive logic circuits as hardware resources or may be implemented by software through a computer program.

The via generation module 13 encompasses a current dissipation calculation module 131 configured to calculate current dissipation data of the logic elements, a resistance component extraction module 132 configured to extract the resistance component of the power supply wirings, a voltage drop analysis module 133 configured to analyze voltage drop from a control point to a specific position on the subject first-potential-level power supply wiring, an electro-migration analysis module 134 configured to analyze electro-migration and a via allocation calculation module 135 configured to calculate a layout of via allocation. Here, "the via allocation" is a concept including the allocation of stacked-vias, the single cut via and the multi-cut via.

The current dissipation calculation module 131 calculates current dissipation consumed by the logic elements. For example, the current dissipation calculation module 131 calculates current dissipation consumed in a ladder network encompassing a plurality of current paths flowing through each of the logic elements, the current paths are connected in parallel between the subject first-potential-level power supply wiring and the subject second-potential-level power supply wiring. Furthermore, the current dissipation calculation module 131 estimates load capacitances of the logic elements from information of global or detailed routing and calculates transient current dissipation associated with charge/discharge of capacitors in the logic elements. The current dissipation calculation module 131 further calculates static through-currents, or the short-circuit currents flowing the logic elements respectively, from the input signal of each of the logic elements by simulation. From these results, the current dissipation data of the logic elements is obtained.

Considering the performance of the logic elements, etc., the voltage drop analysis module 133 analyzes interval voltage drop and determines the tolerable voltage drop corresponding to the interval voltage drop. The electro-migration analysis module 134 analyzes tolerable electro-migration current from operating temperature and endurance years, operating frequency, cross section of the wirings. The via allocation calculation module 135 compares summation of through-currents flowing the logic elements, which are arranged in a region from the control point to the specific point, with the tolerable electro-migration current, and further comparing the interval voltage drop with a tolerable voltage drop so as to calculate an optimum location of the via configured to supply power from the subject first-potential-level power supply wiring to the logic elements.

The data memory 2d encompasses: a current dissipation file 21 storing the current dissipation data of each logic element calculated by the current dissipation calculation module 131, a power supplying location file 22 storing information of power supplying location, an interval voltage drop file 23b storing the interval voltage drop analyzed by the voltage drop analysis module 133, a tolerable voltage drop file 23a storing the tolerable voltage drop and a tolerable electro-migration current file 24 storing the tolerable electro-migration current analyzed by the electro-migration analysis module 134.

A keyboard, a mouse, a light pen or flexible disk equipment, etc may implement an input unit 4 shown in FIG. 1. Through the input unit 4, an operator, or a layout designer can specify input/output data. Further, the operator can set numerical values and so on, which are necessary for the automatic design of semiconductor integrated circuit through the input unit 4. In addition, it is possible to set layout parameters such as forms of output data from the input unit 4, and to input such instructions as execution commands of operation or stop commands. And the output unit 6 and the display unit 5 are respectively implemented by a printer and a display unit, etc. The display unit 5 displays input/output data and layout results, etc. Input/output data, layout parameters, and histories of layout design and intermediate data under operation are stored in the data memory 2*d*.

It will be more clarified in the description of the following computer-aided design method, according to the designing tool of the first embodiment, electric power can be supplied to the logic elements so that the problems of electromigration and voltage drop do not occur.

Figure 6A:
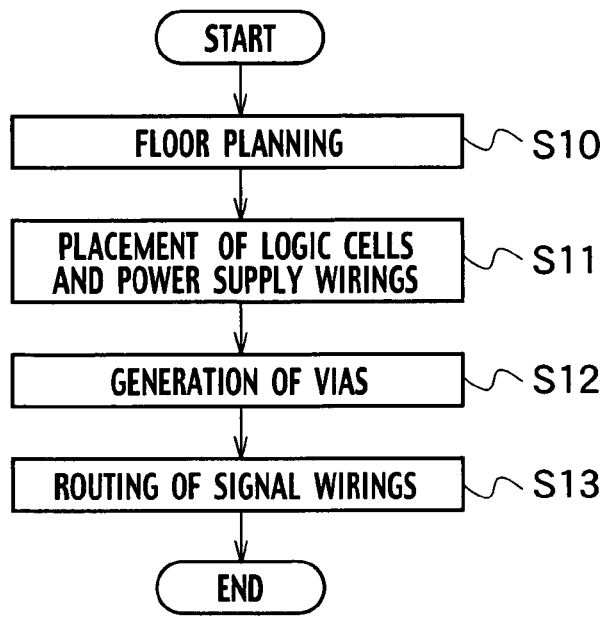
FIG. 6A is a schematic flow chart showing a sequence of processes for accomplishing a computer-aided design method according to the first embodiment of the present invention.

Then, a computer-aided design method of the first embodiment is explained by the flowchart shown in FIG. 6A:

(a) The floor-planning module 11 provided in the CPU 1*a* of the CAD tool (CAD system) shown in FIG. 1, performs the task of floorplan layout at step S10. As shown in FIG. 7, by the task of floorplan layout, I/O cells 311-31*p*, 321-32*q*, 331-33*r* and 341-34 are placed in the peripheral zone and a macrocell 30 is placed in the logic element arrangement region in the chip area of the semiconductor integrated circuit, which is imaginarily provided in the memory space of the CAD tool. "The logic element arrangement region" is a rectangular region having a perimeter surrounded by the I/O cells 311-31*p*, 321-32*q*, 331-33*r* and 341-34 in each chip area. The I/O cells 311-31*p*, 321-32*q*, 331-33*r* and 341-34 and the macrocell 30 are placed first, because the I/O cells are to some extent fixed block and the macrocell 30 is comparatively a large block, occupying a relatively large fraction of the logic element arrangement region.

Figure 8:
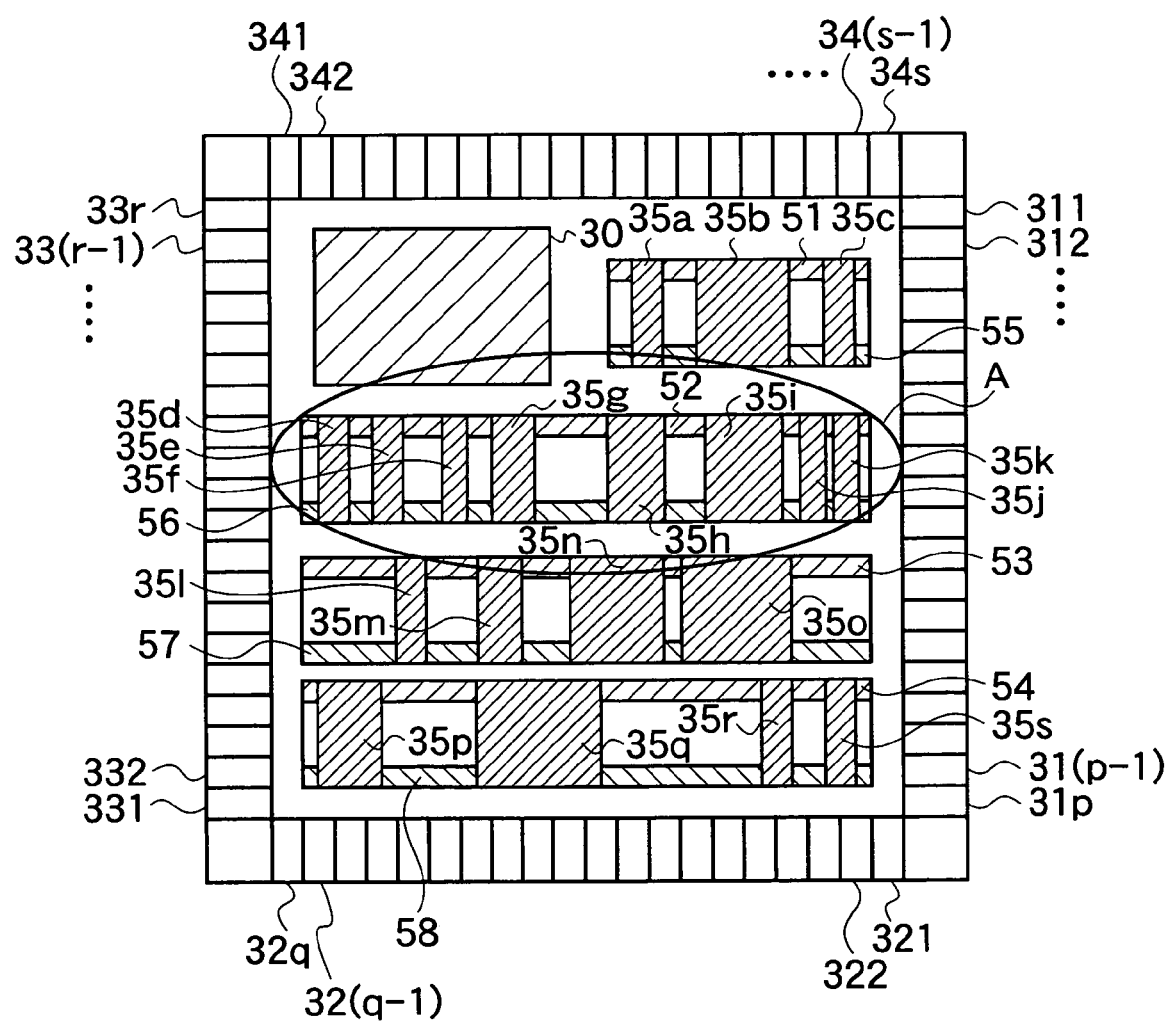
FIG. 8 is a plan view illustrating a result of a placement process, by which logic cells, subject/lower first-potential-level power supply wirings (high-potential power supply wirings) and subject/lower second-potential-level power supply wirings (low-potential power supply wirings) are placed in the logic element arrangement region, in the computer-aided design method of the first embodiment.
Figure 9A:
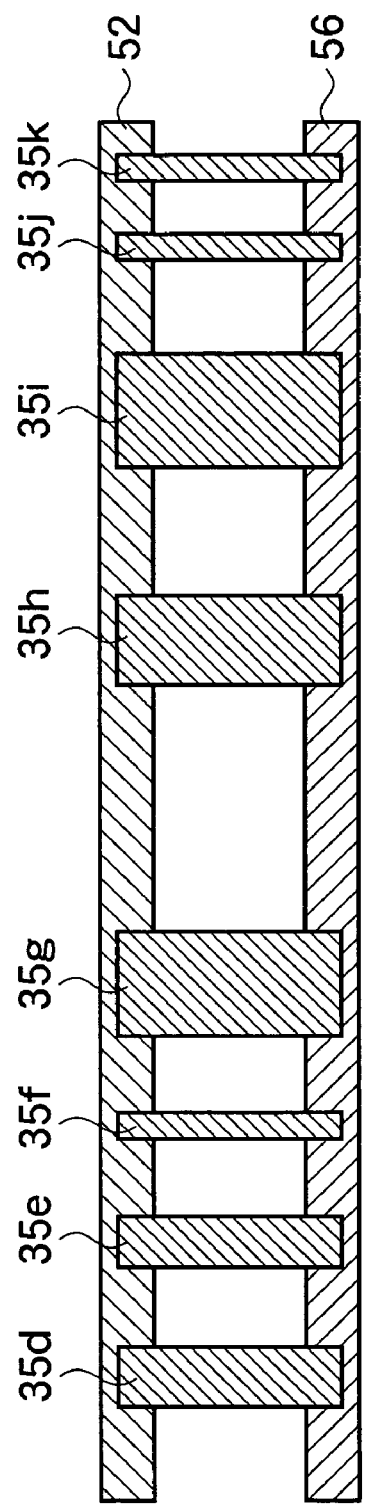
FIG. 9A is an enlarged plan view illustrating the second horizontal row of the logic cells in FIG. 8, which is encircled by a circle labeled with A.

(b) Next, at step S11, the logic element placement module 12 provided in the CPU 1*a* performs placement process of the logic cells (logic elements) 35*a*-35*c*; 35*d*-35*k*; 35*l*-35*o* and 35*p*-35*s* and the power supply wirings in the logic element arrangement region as shown in FIG. 8. For example, the logic element placement module 12 places subject first-potential-level power supply wirings (high-potential power supply wirings) 51-54 extending along a fixed direction in a subject wiring level (the fifth wiring level) and subject second-potential-level power supply wirings (low-potential power supply wirings) 55-58 extending along the fixed direction in second subject wiring level (the fourth wiring level) as shown in FIG. 8. The subject wiring level and the second subject wiring level differ from a level in which the logic elements 35*a*-35*c*; 35*d*-35*k*; 35*l*-35*o* and 35*p*-35*s* are placed. Under the subject first-potential-level power supply wiring 53 of the fifth wiring level, a lower first-potential-level power supply wiring 36 of the first wiring level is placed as shown in FIG. 4. Though illustration is omitted, another lower first-potential-level power supply wirings of the first wiring level are similarly placed under the subject first-potential-level power supply wirings 51, 52 and 54 of the fifth wiring level. Under the subject second-potential-level power supply wiring 57 of the fourth wiring level, a lower second-potential-level power supply wiring 37 of the first wiring level is placed as shown in FIG. 5. Though illustration is omitted, another second-potential-level power supply wirings (second-potential-level power supply wirings) of the first wiring level are similarly placed under the subject second-potential-level power supply wirings 55, 56 and 58 of the fourth wiring level. A plurality of logic cells (logic elements) 35*a*-35*c*; 35*d*-35*k*; 35*l*-35*o* and 35*p*-35*s* are placed in the first wiring level at different site from the area where the macrocell 30 of the logic element arrangement region is placed divided into four horizontal rows. Because the lower first-potential-level power supply wiring 36 of the first wiring level, the lower second-potential-level power supply wiring 37 of the first wiring level, the subject second-potential-level power supply wiring 57 of the fourth wiring level and the subject first-potential-level power supply wiring 53 of the fifth wiring level are implemented by a single set of data as an element of an integrated circuit with a plurality of logic cells (logic elements) 35*l*, 35*m*, 35*n* and 35*o*, when the logic cells (logic elements) 35*l*-35*o* are placed in the third horizontal row from the top, the lower first-potential-level power supply wiring 36 of the first wiring level, the lower second-potential-level power supply wiring 37 of the first wiring level, the subject second-potential-level power supply wiring 57 of the fourth wiring level and the subject first-potential-level power supply wiring 53 of the fifth wiring level are simultaneously placed in the logic element arrangement region. Though detailed illustration of the first wiring level is omitted, as shown in FIG. 8, the subject second-potential-level power supply wiring 55 of the fourth wiring level and the subject first-potential-level power supply wiring 51 of the fifth wiring level are implemented by a single set of data as an element of the integrated circuit with a plurality of logic cells (logic elements) 35*a*-35*c* on the top horizontal row of the logic element arrangement region. Similarly, the subject second-potential-level power supply wiring 56 of the fourth wiring level and the subject first-potential-level power supply wiring 52 of the fifth wiring level are implemented by a single set of data as an element of the integrated circuit with a plurality of logic cells (logic elements) 35*d*-35*k* on the second horizontal row of the logic element arrangement region. Furthermore, the subject second-potential-level power supply wiring 58 of the fourth wiring level and the subject first-potential-level power supply wiring 54 of the fifth wiring level are implemented by a single set of data as an element of the integrated circuit with a plurality of logic cells (logic elements) 35*p*-35*s* on the bottom horizontal row of the logic element arrangement region. FIG. 9A shows an enlarged view of the second horizontal row from the top in FIG. 8, which is encircled by a circle labeled with A, illustrating a layout configuration in which the subject second-potential-level power supply wiring 56 of the fourth wiring level, the subject first-potential-level power supply wiring 52 of the fifth wiring level and the logic cells (logic elements) 35*d*-35*k* are placed by step S11.

Figure 9B:
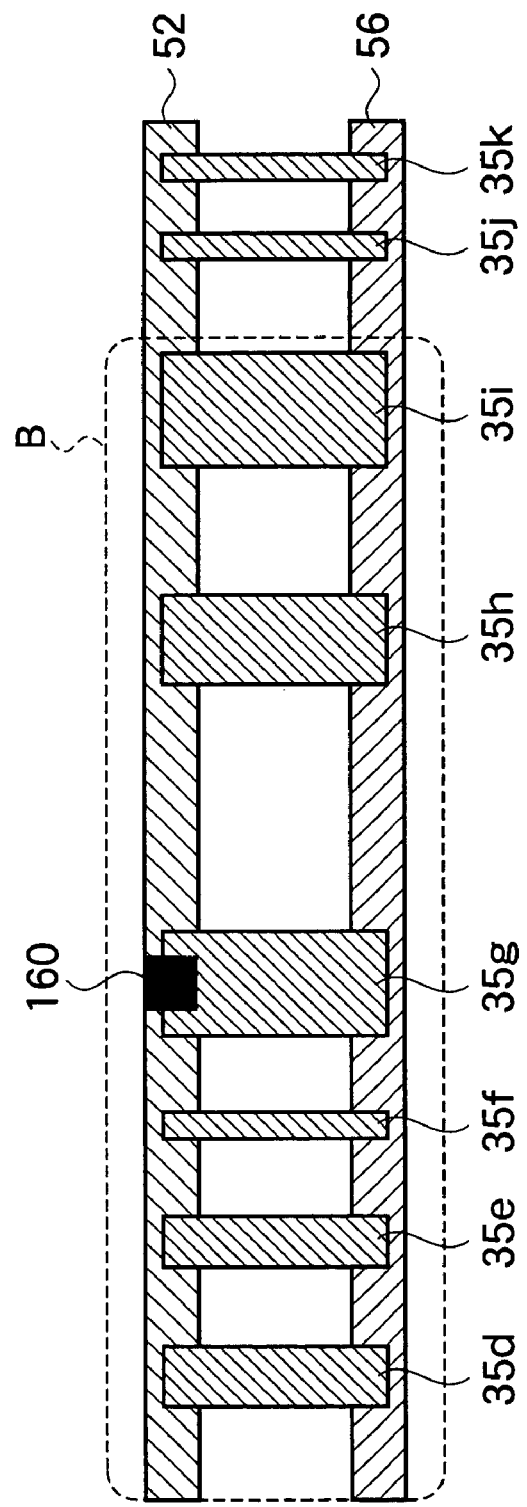
FIG. 9B is another enlarged plan view illustrating the second horizontal row corresponding to FIG. 9A, in which a stacked-via is allocated in an intersection point of the logic cell with the subject first-potential-level power supply wiring.
Figure 11:
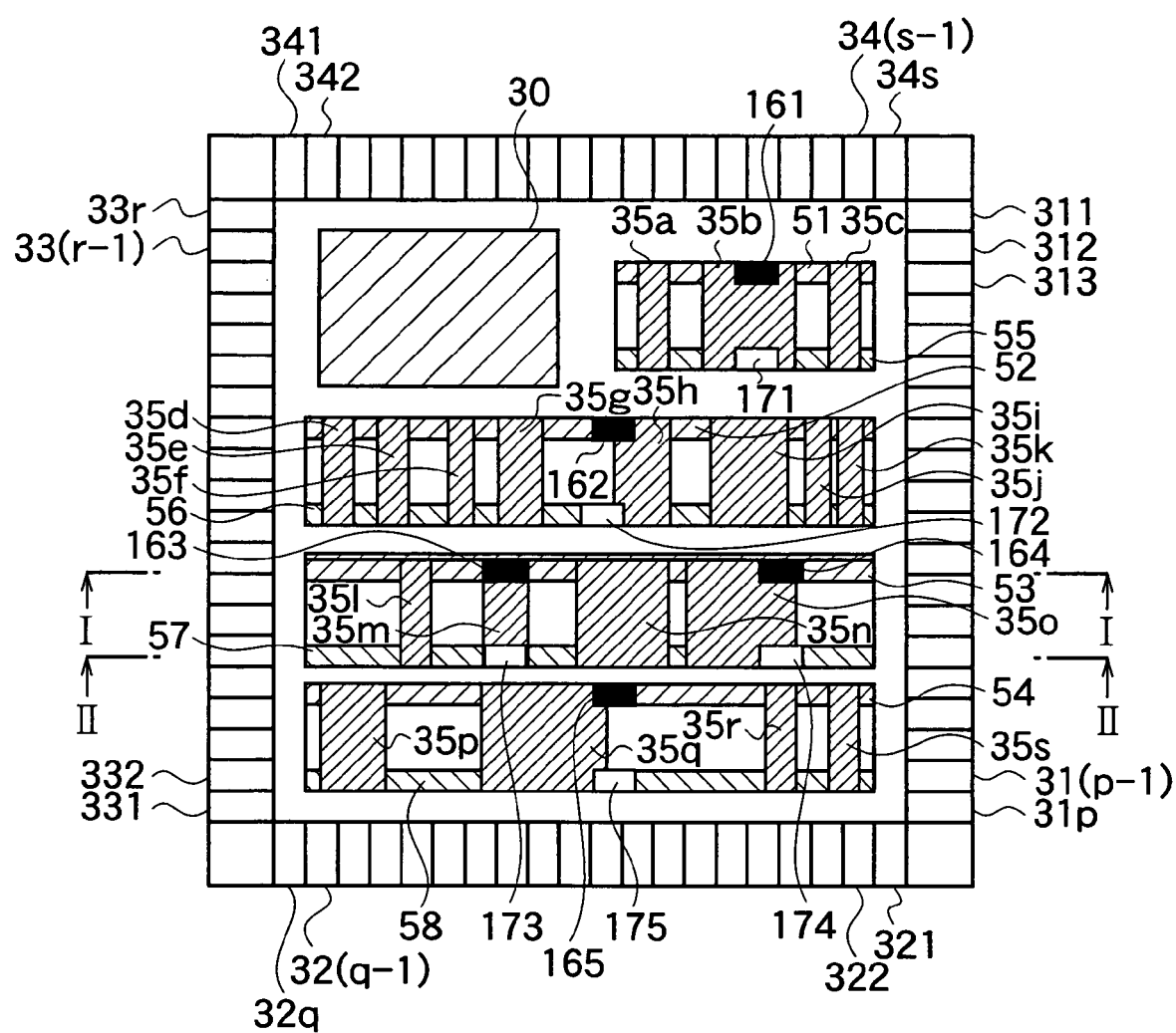
FIG. 11 is a plan view of a semiconductor integrated circuit of the first embodiment, illustrating a layout of stacked-vias, logic cells, subject/lower first-potential-level power supply wirings (high-potential power supply wirings) and subject/lower second-potential-level power supply wirings (low-potential power supply wirings) placed in the logic element arrangement region.

(c) Next, at step S12, as shown in FIG. 11, the via generation module 13 provided in the CPU 1*a* calculates optimum locations of the stacked-vias and places the stacked-vias to the optimum locations so as to generate a plurality of first stacked-vias 161-165 on the subject first-potential-level power supply wirings 51-54 of the fifth wiring level and to generate a plurality of second stacked-vias 171-175 on the subject second-potential-level power supply wirings 55-58 of the fourth wiring level. The details of step S12 will be described later, through the flowchart shown in FIG. 6B, the first stacked-vias 161-165 and second stacked-vias 171-175 are allocated regularly, with a tolerable interval in which electro-migration and voltage drop are not a problem For example, the first stacked-vias 163 and 164 can directly supply the first-potential-level power VDD from the subject first-potential-level power supply wiring 53 of the fifth wiring level to the lower first-potential-level power supply wiring 36 of the first wiring level, as shown in FIG. 4. Similarly, the second stacked-vias 173 and 174 can directly supply the second-potential-level power (ground) VSS from the subject second-potential-level power supply wiring 57 of the fourth wiring level to the lower second-potential-level power supply wiring 37 of the first wiring level, as shown in FIG. 5. FIG. 9B shows a layout configuration in which a first stacked-via 160 is allocated to the optimum location by step S12 in an intersection point of the logic cell (logic element) 35g with the subject first-potential-level power supply wiring 52 of the fifth wiring level.

(d) Next, at step S13, the signal wiring routing module 14 provided in the CPU 1a routes signal wirings in a routing space formed between a plurality of macrocells so as to connect the macrocells. The signal wiring routing module 14 further routes signal wirings in routing spaces formed between the logic cells (logic elements) 35a-35c; 35d-35k; 35l-35o and 35p-35s so as to connect mutually these logic cells 35a-35c; 35d-35k; 35l-35o and 35p-35s. The signal wiring routing module 14 further routes signal wirings in routing spaces formed between the macrocell 30 and the logic cells 35a-35c; 35d-35k; 35l-35o and 35p-35s so as to connect the macrocell 30 with the logic cells 35a-35c; 35d-35k; 35l-35o and 35p-35s. The signal wirings are automatically routed through the algorithm of the automatic design.

<Details of Step S12>

Figure 10:
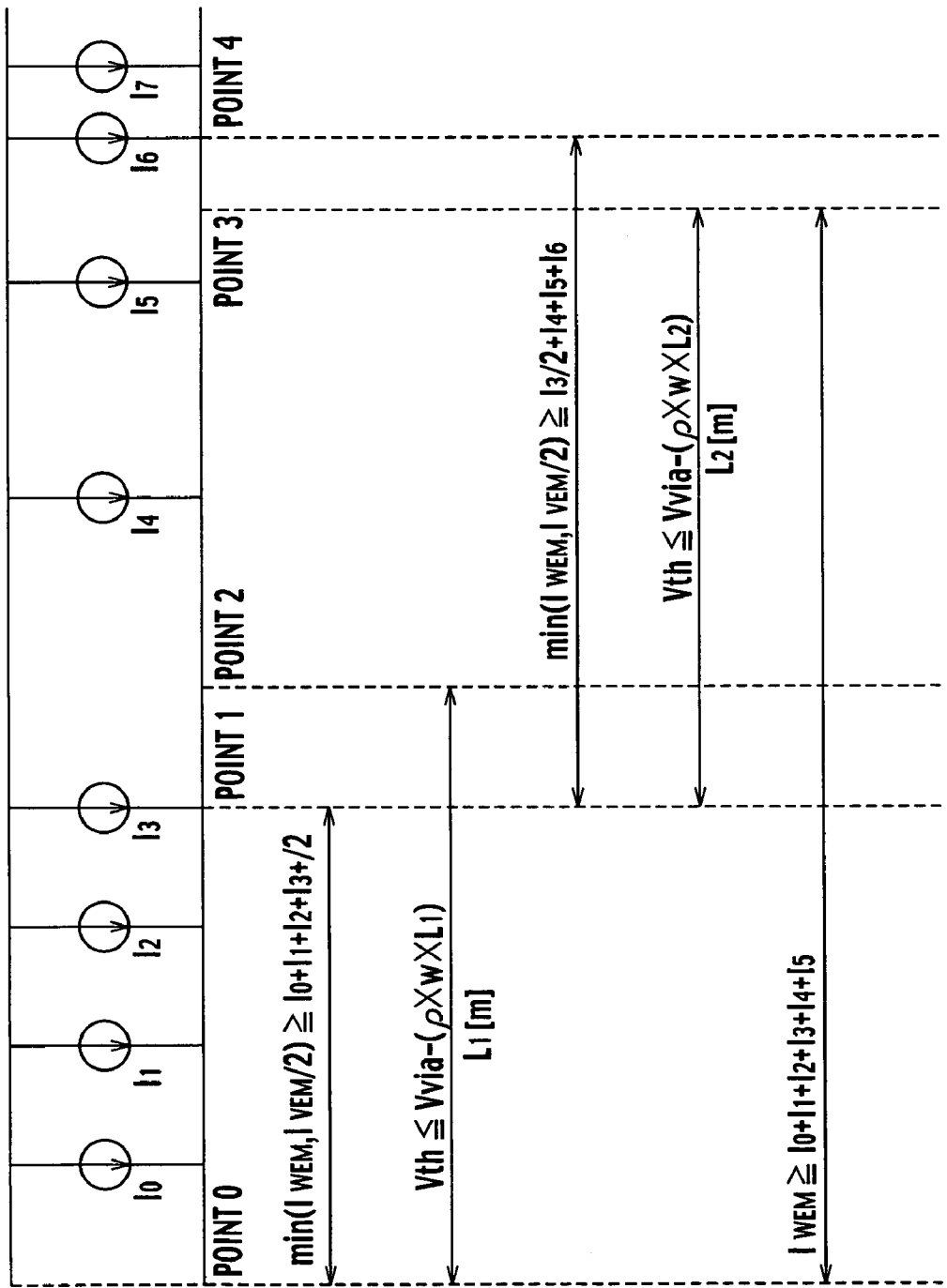
FIG. 10 is an equivalent circuit of the physical layout of second horizontal row in the logic element arrangement region shown in FIG. 9A, which shows a ladder network encompassing a plurality of current paths flowing through each of the logic elements of FIG. 9A, the current paths are connected in parallel between the subject first-potential-level power supply wiring and the subject second-potential-level power supply wiring.

The detailed sequence of procedures in the step S12, in which the position of the first stacked-via 160 is determined, as shown in FIG. 9B, on the layout configuration where the subject second-potential-level power supply wiring 56 of the fourth wiring level, the subject first-potential-level power supply wiring 52 of the fifth wiring level and the logic cells (logic elements) 35d-35k are placed through the step S11 of FIG. 6A will be explained by the flowchart of FIG. 6B and FIG. 10. The ladder network shown in FIG. 10 is an equivalent circuit corresponding to the physical layout of second horizontal row in the logic element arrangement region shown in FIG. 8, the second horizontal row is encircled by a circle labeled with A:

In Re Step S111

To begin with, at step S111, a current dissipation calculation module 131 provided in CPU 1a estimates each of load capacitances of the logic elements from the wiring information associated with global or detailed routing so as to calculate current dissipation. That is, the current dissipation calculation module 131 calculates dynamic current dissipation associated with charge and discharge of the capacitances implemented by the logic elements. At step S111, the current dissipation calculation module 131 further calculates through-currents, or the short-circuit current flowing through the logic elements, from the input signal of the logic elements through simulation using the ladder network shown in FIG. 10. The short-circuit current may correspond to the crowbar current flowing through CMOS logic elements, which is created when the transistor's inputs are changing from low to high or high to low because the p-channel and the n-channel devices are both on in their linear regions at the same time. From these results, the current dissipation data of the logic elements are calculated. For example, current dissipation Id (0, 3) between Point 0 (control point) and Point 1 (specific position) in the ladder network shown in FIG. 10 is calculated, with through-currents $I_0$, $I_1$, $I_2$, and $I_3$ which flow respectively through the logic cells (logic elements) 35d, 35e, 35f and 35g, by:

$$Id(0, 3) = I_0 + I_1 + I_2 + I_3/2 \quad (1a)$$

In Eq. (1a), only the fourth term in the right-hand member is divided by two, because through-current flowing through the logic cell (logic element) 35g is shared by the right side and left side of Point 1 in FIG. 10. The current dissipation Id (0, 4) which is dissipated by through-currents flowing through the logic cells (logic elements) 35d, 35e, 35f, 35g and 35h of FIGS. 9A and 9B is obtained, with a through-current $I_4$ for the logic cell (logic element) 35h, by:

$$Id(0, 4) = I_0 + I_1 + I_2 + I_3 + I_4/2 \quad (1b)$$

In Eq. (1b), only the fifth term in the right-hand member is divided by two, because through-current flowing through the logic cell (logic element) 35h is shared by the right side and left side of logic cell 35h. More generally, current dissipation Id(0, n), which is dissipated by through-currents flowing through the $0^{th}$ logic cell (logic element) to the nth logic cell (logic element), is calculated with through-current $I_m$ flowing through the $m^{th}$ logic cell (logic element), under the condition that the through-current of the $n^{th}$ logic cell (logic element) is shared by the right side and left side of the $n^{th}$ logic cell ("m"=0−(n−1); "n" is an integer equal to or larger than two), as:

$$Id(0, n) = (\Sigma_{(m=0, n-1)} I_m) + I_n/2 \quad (1c)$$

In Eq. (1c), $\Sigma_{(m=0, n-1)} I_m$ is different from usual mathematical symbol, and represent the summation of $I_m$ from m=0 to m=n−1 in this specification. When "subject Point n" on a subject horizontal row, in which the current dissipation is supposed to be calculated, is not located on a logic cell (logic element), the subject through-current is not shared by the right side and left side of the "subject Point n", Eq. (1c) is simplified as follows:

$$Id(0, n) = \Sigma_{(m=0, n)} I_m \quad (1d)$$

Similar to the definition stated in Eq. (1c), $\Sigma_{(m=0, n)} I_m$ represents the summation of $I_m$ from m=0 to m=n. In the meantime, current dissipation Id (3, 6) between Point 1 and Point 4 is calculated, with through-current $I_4$, $I_5$, and $I_6$ which flow respectively through the logic cells (logic elements) 35h, 35i and 35j shown in FIG. 9A, as:

$$Id(3, 6) = I_3/2 + I_4 + I_5 + I_6 \quad (1e)$$

In addition, current dissipation Id (3, 7) of the region between the logic cells (logic elements) 35g-35h of FIG. 9A is calculated with a through-current $I_7$ which flows through the logic cell (logical element)

$$I_d(3, 7) = I_3/2 + I_4 + I_5 + I_6 + I_7 \quad (1f)$$

As mentioned in Eqs. (1e) and (1f), since through-current flowing through the logic cell (logic element) 35g is shared by the right side and left side of Point 1 in the ladder network shown in FIG. 10, the value of $I_3/2$ is used for the first term of the right-hand member of Eq. (1f). More generally, current dissipation Id(n, p) in a region occupied by $n^{th}$ logic cell (logic element) to the $p^{th}$ logic cell (logic element) is calculated, with a through-current $I_m$ flowing through the $m^{th}$ logic cell (logic element), under the condition that through-current of the $n^{th}$ logic cell (logic element) is being shared by the right side and the left side, as:

$$Id(n, p) = I_n/2 + (\Sigma_{(m=n+1, p)} I_m) \quad (1g)$$

Similar to the definition stated in Eqs. (1c) and (1d), $\Sigma_{(m=n+1, n)} I_m$ represents the summation of $I_m$ from m=n+1 to m=p in Eq. (1g). Still, when a "subject Point n" on the subject horizontal row in which the current dissipation is supposed to be calculated, does not exist on a logic cell (logic element), because the through-current is not shared by the right side and left side of the "subject Point n", Eq. (1g) can be calculated from the right side of the logic cell (logic element) of the $(n+1)^{th}$, as:

$$Id(n, p) = \Sigma_{(m=n+1, p)} I_m \quad (1h)$$

Similar to the definition stated in Eqs. (1c), (1d) and (1g), $\Sigma_{(m=0, n)} I_m$ represents the summation of $I_m$ from m=0 to m=n. Eq. (1h) will be used for the calculation of the value of Id(n, p), when the value of Id(0, n) is calculated with Eq. (1d). The calculated value of current dissipation Id(0, 3), Id(0, 4), Id(3, 6), Id(3, 7), Id(0, n) and/or Id(n, p), etc. are stored in the current dissipation file 21 provided in the data memory 2d.

In Re Step S112

After the process at step S11, a resistance component extraction module 132 provided in the CPU 1a extracts the resistance component at step S112. For example, with $\rho[\Omega/\square]$ as a sheet resistance of a subject power supply wiring, W[m] as a width of the power supply wiring, $L_1$[m] as a length of the subject power supply wiring between Point 0 (the control point) and Point 1 (the specific position) and $L_2$[m] as a length of the subject power supply wiring between Point 1 and Point 4, for a unit thickness of the subject power supply wiring, a resistance value $R_{p01}$ [$\Omega$] of the subject power supply wiring in an interval between Point 0 (the control point) and Point 1 (the specific position) is given:

$$R_{p01} = \rho \times L_1/w \quad (2a)$$

Similarly, a resistance value $R_{p14}$ [$\Omega$] of the subject power supply wiring in an interval between Point1 and Point4 is given:

$$R_{p14} = \rho \times L_2/w \quad (2b)$$

In Re Step S113

After the process at step S112, a voltage drop analysis module 133 provided in the CPU 1a analyzes tolerable voltage drop at step S113. Considering performance of the logic elements, etc., voltage drop analysis module 133 determines the tolerable voltage drop. With $V_{th01}$[V] as a tolerable voltage drop between Point 0 (control point) and Point 1 (specific position), $V_{via}$[V] as a voltage value at the generated stacked-via site and Ip[A] as a current value which flows in the power supply wirings, the tolerable voltage drop $V_{th01}$ is analyzed by a condition of:

$$V_{th01} \leq V_{via} - (Ip \times R_{p01}) \quad (3a)$$

Voltage value $V_{via}$ [V] of the stacked-via site is calculated by considering voltage drop from a location of voltage power supply of the semiconductor chip to a location of the subject stacked-via. $(Ip \times R_{p01})$ defines "the interval voltage drop" between Point 0 (control point) and Point 1 (specific position). The interval voltage drop $(Ip \times R_{p01})$ needs to be calculated beforehand and to be stored at the interval voltage drop file 23b, being read out from the interval voltage drop file 23b in the calculation of Eq. (3a). Similarly, a tolerable voltage drop $V_{th14}$[V] between Point1 and Point4 (second control point) is analyzed by a condition of:

$$V_{th14} \leq V_{via} - (Ip \times R_{p14}) \quad (3b)$$

$(Ip \times R_{p14})$ defines the interval voltage drop between Point 1 and Point4 (second control point). The interval voltage drop $(Ip \times R_{p14})$ needs to be calculated beforehand and to be stored at the interval voltage drop file 23b, so that interval voltage drop $(Ip \times R_{p14})$ can be read out from the interval voltage drop file 23b in the calculation of Eq. (3b). The generic representation for Eqs. (3a) and (3b) becomes as follows:

$$V_{th} \leq V_{via} - (Ip \times Rp) \quad (3c)$$

The analyzed tolerable voltage drop $V_{th01}$, $V_{th14}$, . . . are stored in the tolerable voltage drop file 23a provided in the data memory 2d.

In Re Step S114

After the process at step S113, an electro-migration analysis module 134 provided in the CPU 1a analyzes tolerable electro-migration current at step S114. The electro-migration analysis module 134 calculates a tolerable electro-migration current $I_{WEM}$[A] from operating temperature, endurance years, operating frequency, cross section of the semiconductor integrated circuit. The analyzed tolerable electro-migration current $I_{WEM}$[A] is stored in the tolerable electro-migration current file 24 provided in the data memory 2d.

In Re Step S115

After the process at step S114, a stacked-via allocation calculation module 135 provided in CPU 1a calculates optimum locations of the stacked-vias at step S115. Value of $I_{VEM}/2$[A] must be considered in a case when a stacked-via is located on a logic element connected to a power supply wiring, since taking $I_{VEM}$[A] as the tolerable electro-migration current of the stacked-via, the current supplied from the stacked-via must feed currents for the logic elements of the right and left of the stacked-via.

To determine allocation of a stacked-via, the tolerable electro-migration current $I_{VEM}$[A] of the stacked-via in a case when a subject stacked-via is not disposed on a logic element is firstly compared with the tolerable electro-migration current $I_{VEM}/2$[A] of the stacked-via in a case when the subject stacked-via is disposed on the logic element. That is to say, the determination of the tolerable electro-migration current is based upon "the smaller value min $(I_{WEM}, I_{VEM}/2)$", or the more severer value between the tolerable electro-migration current $I_{VEM}$[A] for the subject stacked-via is not disposed on a logic element and the tolerable electro-migration current $I_{VEM}/2$[A] for the subject stacked-via is disposed on the logic element.

After the value of $\min(I_{WEM}, I_{VEM}/2)$ is obtained, the current dissipation Id(0, n) from $0^{th}$ logic cell (logic element) to $n^{th}$ logic cell (logic element) is read out from the current dissipation file 21. And, allocation of the stacked-via is so determined that the value of $\min(I_{WEM}, I_{VEM}/2)$ becomes larger than the current dissipation Id(0, n) as:

$$\min(I_{WEM}, I_{VEM}/2) \geq Id(0, n) \quad (4a)$$

Furthermore, the current dissipation Id(0, n+1) from $0^{th}$ logic cell (logic element) to $(n+1)^{th}$ logic cell (logic element) is read out from the current dissipation file 21. Then, the allocation of the stacked-via is so determined that the smaller value $\min(I_{WEM}, I_{VEM}/2)$ is smaller than the current dissipation Id(0, n+1) as:

$$\min(I_{WEM}, I_{VEM}/2) \leq Id(0, n+1) \quad (4b)$$

Namely, the allocation of the stacked-via which meets both conditions prescribed by Eqs. (4a) and (4b) is determined as an optimum allocation of the stacked-via.

Furthermore, the requirements of the tolerable voltage drops $V_{th01}$, $V_{th14}$ . . . , which are calculated respectively by Eqs. (3a), (3b) or (3c) at step S113, must be satisfied simultaneously to determine the allocation of the stacked-via. Then, the tolerable voltage drops $V_{th01}$, $V_{th14}$ . . . are read out from the tolerable voltage drop file 23a provided in the data memory 2d.

For example, as shown in FIG. 10, to allocate a stacked-via at Point 1 (specific position), the allocation at Point 1 must meets the requirements of Eqs. (3a), (4c) and (4d) simultaneously. Here, Eq. (3a) is prescribed by the tolerable voltage drops $V_{th01}$ between Point 0 (control point) and Point 1 (specific position), and Eqs. (4c) and (4d) are given respectively by:

$$\min(I_{WEM}, I_{VEM}/2) \geq Id(0. 3) \quad (4c)$$

$$\min(I_{WEM}, I_{VEM}/2) \leq Id(0. 4) \quad (4d)$$

That is, under the condition that the requirements of Eqs. (3a), (4c) and (4d) are satisfied simultaneously, the allocation of the stacked-via at Point 1 will not cause the problems of voltage drop and electro-migration in the region between Point 0 (control point) and Point 1 (specific position). Furthermore, to allocate the stacked-via at Point 1 (specific position), the allocation at Point 1 must meets the requirements of Eqs. (3b), (4e) and (4f) simultaneously. Here, Eq. (3b) is prescribed by the tolerable voltage drops $V_{th14}$ between Point 1 (specific position) and Point 4 (second control point) and Eqs. (4e) and (4f) are given respectively by:

$$\min(I_{WEM}, I_{VEM}/2) \geq Id(3, 6) \quad (4e)$$

$$\min(I_{WEM}, I_{VEM}/2) \leq Id(3, 7) \quad (4f)$$

That is, under the condition that the requirements of Eqs. (3b), (4e) and (4f) are satisfied simultaneously, the allocation of the stacked-via at Point 1 will not cause the problems of voltage drop and electro-migration in the region between Point 1 (specific position) and Point 3.

From the relations stated by Eqs. (4c) and (4e), following Eq. (4g) is obtained:

$$\min(I_{WEM}, I_{VEM}/2) \geq Id(0. 6) \quad (4g)$$

The allocation of the stacked-via calculated at step S115 is stored in a power supplying location file 22 provided in the data memory 2d.

In Re Step S116

After the process at step S115, a via placement module 17 provided in the CPU 1a reads out optimum locations of the stacked-vias from the power supplying location file 22, and the via placement module 17 places respectively the stacked-vias to the optimum locations of the stacked-vias at step S116.

An example of placing a stacked-via 160 for power supply at Point 1 (specific position) at step S116 is shown in FIG. 9B. By this placement process at step S116, the stacked-via 160 placed in Point 1 (specific position) causes no problem of electro-migration for the region B, which includes the logic cells (logic elements) 35d, 35e, 35f, 35g-35h and 35i as shown in FIG. 9B, due to the condition stated by Eq. (4g), and also has no problem of voltage drop for the region B due to the conditions stated by Eq. (3a) and Eq. (3b).

From the layout configuration, power supply can be established so that the problems of voltage drop and electro-migration will not occur in the stacked-via 160 placed at Point 1 (specific position) in the region B of FIG. 9B.

Iteration with New Control Point

Figure 6B:
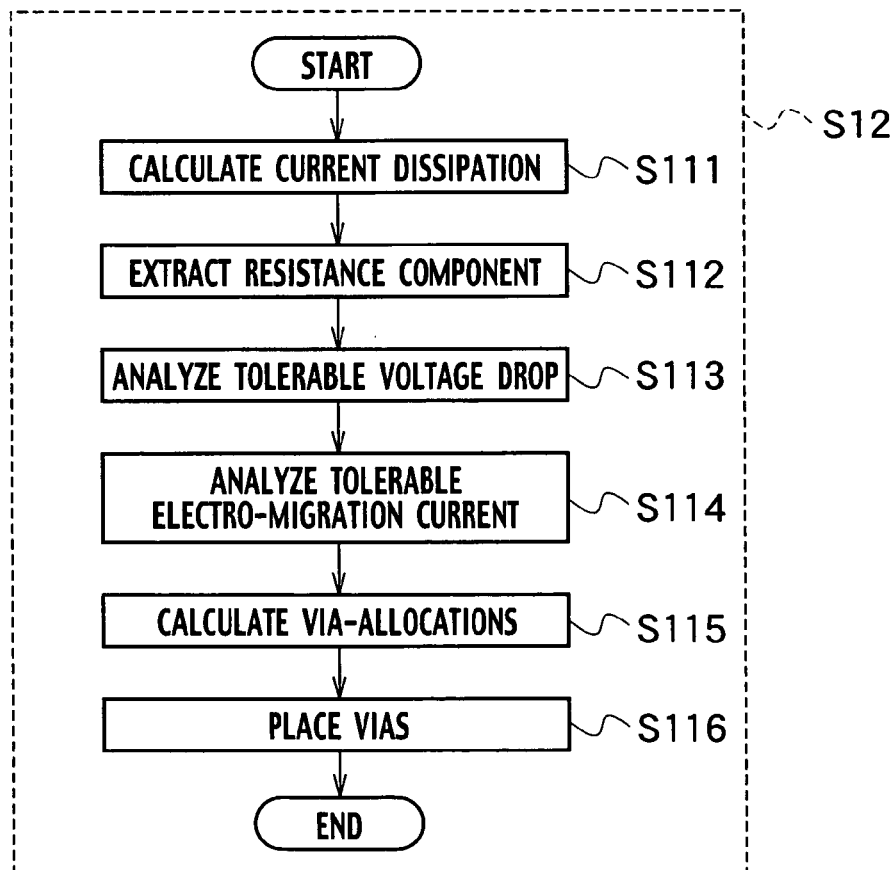
FIG. 6B is a detailed flow chart showing a sequence of processes for accomplishing a step S12 in FIG. 6A.

After the completion of the process sequence of steps S111-S116 of the flowchart shown in FIG. 6B, the position at Point 3 shown in FIG. 10 is defined as a new Point (new control point). And a new specific position corresponding to the new control point and a new second control point corresponding to the new specific position and the new control point are defined. Then, in an interval between the new second control point and the new specific position and an interval between the new specific position and the new second control point, similar calculations as the process sequence of steps S111-S116 is performed. The setting of a further new Point 0 (the new control point) and a further new specific position for the further new control point and a further new second control point is iterated to the termination of the subject horizontal row.

Furthermore, similar calculation of step S111-S116 is repeated for every horizontal rows so that stacked-vias are allocated in whole region of the logic element arrangement region.

Through the computer-aided design method of the first embodiment, in a localized area where logic cells (logic elements) are densely arranged, a large number of stacked-vias can be allocated and power supply to the logic elements can be established by a densely arranged stacked-vias from a subject first-potential-level (high-potential) power supply wiring and a subject second-potential-level (low-potential) power supply wiring. Because of the non-uniform allocation of the stacked-vias, the electro-migration immunity of the first-potential-level power supply wirings (high-potential power supply wirings) can be improved. And also, the voltage drop of in the first-potential-level (high-potential) power supply wiring can be decreased.

In addition, through the computer-aided design method of the first embodiment, since the number of allocated stacked-vias at a localized area where logic elements are sparsely arranged can be decreased, area usage efficiency and integration degree can also be improved. In short, in the localized area where the logic elements are sparsely arranged, by decreasing allocation number of stacked-vias, which obstructs and hinders the routing process, the routing space can be ensured. Therefore, according to the computer-aided design method of the first embodiment, since useless roundabout wirings or useless detours can be decreased, the integration degree of the semiconductor integrated circuit can be improved.

<Computer Program Product>

By controlling the operation of the CAD tool by a computer program equivalent to the algorithm shown in FIGS. 6A and 6B, the sequence of processes of automatic design shown in the flow of FIGS. 6A and 6B can be executed. The program memory 2m shown in FIG. 1 may store the computer program. That is to say, the computer program product for designing an integrated circuit of the first embodiment encompasses:

(a) Instructions to the logic element placement module 12 for placing a plurality of logic elements in a logic element arrangement region defined in a chip area (b) Instructions to the logic element placement module 12 for placing a subject first-potential-level (high-potential) power supply wiring in a subject wiring level and a lower first-potential-level power supply wiring in a wiring level under the subject wiring level. The subject first-potential-level power supply wiring supplies the power supply voltage to the lower first-potential-level power supply wiring. The subject wiring level is a wiring level different from the level in which the target logic elements are placed. The subject first-potential-level power supply wiring extends along a fixed direction in the subject wiring level. The lower first-potential-level power supply wiring extends along the same direction as the subject first-potential-level power supply wiring. The lower first-potential-level power supply wiring supplies the power supply voltage to the target logic elements.

(c) Instructions to the logic element placement module 12 for placing a subject second-potential-level power supply wiring in second subject wiring level, being paired with and running in parallel with the subject first-potential-level power supply wiring, and a lower second-potential-level power supply wiring extending along the same direction as the subject second-potential-level power supply wiring in a wiring level under the second subject wiring level.

(d) Instructions to the current dissipation calculation module 131 for calculating current dissipation consumed by the logic elements in a ladder network, and for storing the calculated current dissipation in the current dissipation file 21. The ladder network encompasses a plurality of current paths configured to flow through each of the logic elements, the current paths are connected in parallel between the subject first-potential-level power supply wiring and the subject second-potential-level power supply wiring.

(e) Instructions to the electro-migration analysis module 134 for analyzing tolerable electro-migration current of the first-potential-level power supply wirings and for storing the analyzed tolerable electro-migration current in the tolerable electro-migration current file 24.

(f) Instructions to the voltage drop analysis module 133 for analyzing interval voltage drop of the first-potential-level power supply wirings from a control point to a specific position and for storing the analyzed interval voltage drop in the interval voltage drop file 23b.

(g) Instructions to the via allocation calculation module 135 for determining allocation of each of the vias through which voltage is supplied from the first-potential-level power supply wiring to the logic elements, comparing the summation of each of the through-currents flowing the respective logic elements, which are arranged in a region from a control point to a specific point, with tolerable electro-migration current, again comparing the interval voltage drop with tolerable voltage drop.

The computer program product for designing an integrated circuit of the first embodiment can control the sequence of processes of automatic design of the first embodiment, by storing a computer program in a computer-readable recording medium and by installing the recording medium into the program memory 2m. Here, "computer-readable recording medium" includes various media which can record the computer program, such as an external memory unit, a semiconductor memory, a magnetic disk, an optical disk, a magneto-optical (MO) disk, a magnetic tape. Concretely, a flexible disk, a compact disk read-only memory (CD-ROM), a cassette tape, an open reel tape, etc. may be included in the "computer-readable recording medium". For example, a main frame of computer system (the CAD tool) may be provided with a flexible disk unit (flexible disk driver) and/or an optical disk driver, which may be externally connected or built-in. The computer program stored in the recording medium can be installed in a program memory provided in a computer system (CAD tool), by executing required read-out operations, after inserting a flexible disk into a flexible disk driver, or a CD-ROM into a an optical disk driver. And, a ROM as a memory unit and a cassette tape as a magnetic tape unit utilized in a game pack, etc. for example, can be used with an aid of an appropriate interface. In addition, it is possible to store the computer program in the program memory through communication network such as the internet.

<Set of Photomasks>

A plan view of a semiconductor integrated circuit of the first embodiment manufactured with a set of photomasks, which are fabricated based upon the layout design prescribed by the flowchart shown in FIGS. 6A and 6B is shown in FIG. 11 as an example.

Actuality, by the CAD tool (CAD system), based on the layout data generated by a sequence of process prescribed by flowchart shown in FIGS. 6A and 6B, a pattern generator such as an electron beam lithograph system, a set of photomasks (for example, reticles) used for actual manufacturing process of the semiconductor integrated circuit are fabricated. The set of photomasks may embraces:

a photomask necessary for delineating circuit elements constructing the macrocell 30 and the logic cells (logic elements) 35a-35c; 35d-35k; 35l-35o and 35p-35s;

a photomask necessary for delineating a lower first-potential-level (high-potential) power supply wiring 36, a lower second-potential-level (low-potential) power supply wiring 37, other power supply wirings and other signal wirings etc. in the first wiring level;

a photomask necessary for opening via-hole in an inter-level insulator between the first and the second wiring levels;

a photomask necessary for delineating wirings in the second wiring level;

a photomask necessary for opening via-holes in an inter-level insulator between the second and third wiring levels;

a photomask necessary for delineating wirings in the third wiring level;

a photomask necessary for opening via-holes in an inter-level insulator between the third and fourth wiring levels;

a photomask necessary for delineating subject second-potential-level power supply wirings (low-potential power supply wirings) 55-58 and other wirings in the fourth wiring level;

a photomask necessary for opening via-holes in an inter-level insulator between the fourth and fifth wiring levels; and a photomask necessary for delineating subject first-potential-level power supply wirings (high-potential power supply wirings) 51-54 and other wirings in the fifth wiring level.

Then, the set of photomask are successively installed in an exposure tool such as a stepper, and various photolithography process of each stage is conducted. Each of photolithography processes is combined with various semiconductor-manufacturing processes such as ion implantation, reactive ion etching (RIE), chemical vapor deposition (CVD), sputtering, etc., so as to establish a sequence of manufacturing process of the semiconductor integrated circuit, and the sequence of manufacturing process finally completes with a plan view shown in FIG. 11.

<Semiconductor Integrated Circuit>

A semiconductor integrated circuit of the first embodiment is an application specific integrated circuit (ASIC), which is diced into a semiconductor chip as shown in FIG. 11. Each of chip areas assigned on a semiconductor wafer in a matrix form corresponds to the semiconductor chip.

The semiconductor integrated circuit encompasses a plurality of logic cells (logic elements) 35a-35c; 35d-35k; 35l-35o and 35p-35s merged in the semiconductor chip, a plurality of the power supply wirings including a lower first-potential-level (high-potential) power supply wiring 36 of the first wiring level (FIG. 4), a lower second-potential-level (low-potential) power supply wiring 37 of the first wiring level (FIG. 9), a subject second-potential-level power supply wirings 55-58 of the fourth wiring level and a subject first-potential-level power supply wirings 51-54 of the fifth wiring level, each of the power supply wirings is regularly arranged so that power can be supplied to the logic cells (logic elements) 35a-35c; 35d-35k; 35l-35o and 35p-35s.

A plurality of first stacked-vias 161-165 electrically connect an interlevel between the lower first-potential-level power supply wiring 36 of the first wiring level and the subject first-potential-level power supply wirings 51-54 of the fifth wiring level. Also a plurality of second stacked-vias 171-175 electrically connect another interlevel between the lower second-potential-level power supply wiring 37 of the first wiring level and the subject second-potential-level power supply wirings 55-58 of the fourth wiring level. Here, number of the first stacked-vias 161-165 and second stacked-vias 171-175 are more placed in a densely packed area of the logic cells (logic elements) 35a-35c; 35d-35k; 35l-35o and 35p-35s, compared with a sparsely placed area of the logic cells (logic elements) 35a-35c; 35d-35k; 35l-35o and 35p-35s.

In other words, in the semiconductor integrated circuit of the first embodiment, on the lower first-potential-level power supply wiring 36 and the lower second-potential-level power supply wiring 37 of the first wiring level, number of the first stacked-vias 161-165 and second stacked-vias 171-175 are more placed in a localized area where electro-migration immunity is low and voltage drop is easily generated, compared with in another localized area where electro-migration immunity is high and voltage drop is hard to be generated.

The semiconductor substrate of a silicon single crystal can be substantially used as a material for the semiconductor chip. In FIG. 11, a semiconductor chip having a rectangular geometry in a plan view is represented as an example. Though illustration is omitted in FIG. 11, in the most peripheral zone along the each side of the semiconductor chip (on the substrate principal plane), a plurality of outside terminals (chip-site bonding pads) are regularly arranged. Bonding wires or bump electrodes connected with the semiconductor chip-site bonding pads so that the semiconductor integrated circuit can be electrically connected with an external circuit through external package leads or lead frame of a package of the semiconductor integrated circuit. Generally, chip-site bonding pads (outside terminals) are placed in the most upper wiring level of the multilevel interconnection, and are formed by the identical material of the most upper wiring level. In the peripheral zone along each side of the semiconductor chip, within the semiconductor chip-site bonding pads (outside terminals), corresponding to the arrangement of the semiconductor chip-site bonding pads, a plurality of interface circuits (I/O cells) 311-31p, 321-32q, 331-33r and 341-34s are regularly arranged. The I/O cells 311-31p, 321-32q, 331-33r and 341-34s are either of an input interface circuit or an output interface circuit or an input/output interface circuit. Within the peripheral zone surrounded by the I/O cells 311-31p, 321-32q, 331-33r and 341-34s, that is, at the central area on the principal plane of the semiconductor chip, a logic element arrangement region is defined.

In the logic element arrangement region, a macrocell 30 and a plurality of logic cells (logic elements) 35a-35c; 35d-35k; 35l-35o and 35p-35s, etc. are placed. The macrocell 30 is an exclusively designed functional block configured to perform much more complicated logic functions, arithmetic functions and/or memory functions, etc. The logic cells (logic elements) 35a-35c; 35d-35k; 35l-35o and 35p-35s are blocks configured to perform fundamental logic circuits including AND circuit, NAND circuit and FF circuit.

In the first embodiment, a plurality of horizontal rows, each extends along the X direction (the first direction or horizontal direction), are arranged alternately with horizontal wiring channels along the Y direction (the second direction or vertical direction). That is, a plurality of logic cells (logic elements) 35a-35c are arranged in the top horizontal row, a plurality of logic cells (logic elements) 35d-35k are arranged in the second horizontal row from the top, a plurality of logic cells (logic elements) 35l-35o are arranged in the third horizontal row from the top, and a plurality of logic cells (logic elements) 35p-35s are arranged in the bottom horizontal row of the logic element arrangement region.

Each of the logic cells (logic elements) 35a-35c; 35d-35k; 35l-35o and 35p-35s may be implemented by, for example, a complementary circuit of insulated gate field effect transistors (IGFETs) such as a CMOS, though illustration of the cross sectional view or the plan view is omitted. Still, the present invention can be applied to a semiconductor integrated circuit adopting what is called "sea of gate architecture", in which the wiring channel is not alternately formed between the horizontal arrays of the logic cells (logic elements) 35a-35c; 35d-35k; 35l-35o and 35p-35s, each of which extends along the X direction, a plurality of horizontal arrays are arranged along the Y direction. Each of the logic cells (logic elements) 35a-35c; 35d-35k; 35l-35o and 35p-35s may be a circuit implemented by IGFETs of either p- or n-channel, or may be a circuit implemented by bipolar junction transistors (BJTs).

A plurality of lower first-potential-level power supply wirings in the first wiring level, each of which extends along the X direction, are arranged along the Y direction. That is, a first lower first-potential-level power supply wiring extending on the first array of the logic cells (logic elements) of 35a-35c; a second lower first-potential-level power supply wiring extending on the second array of the logic cells (logic elements) of 35d-35k; a third lower first-potential-level power supply wiring 36 (See FIG. 4) extending on the third array of the logic cells (logic elements) of 35l-35o; and a fourth lower first-potential-level power supply wiring extending on the fourth array of the logic cells (logic elements) of 35p-35s are arranged along the Y direction.

The lower first-potential-level power supply wirings of the first wiring level accomplish a layout which is easy to supply first-potential-level power VDD to each of the p channel IGFETs implementing the logic cells (logic elements) of 35a-35c; 35d-35k; 35l-35o and 35p-35s. Because the first-potential-level power VDD establishes a circuit operating voltage, 0.9V-5.0V can be practically used for the value of VDD, for example.

Employing aluminum or aluminum alloy as a main component of wiring material, the lower first-potential-level power supply wirings of the first wiring level are formed. Here, "aluminum alloy" is a material to which another metal such as silicon (Si) and copper (Cu) is mixed to pure aluminum, independently or combined. And the term "main component of wiring material" is used in the meaning that at least the wiring material includes a single layer of an aluminum film or an aluminum alloy film, a composite layer laminating an aluminum film or an aluminum alloy film on a titanium nitride (TiN) film, a composite layer laminating an anti-reflection film such as molybdenum (Mo) film on an aluminum film or an aluminum alloy film.

On the other hand, a plurality of lower second-potential-level power supply wirings in the first wiring level, each of which extends along the X direction, are arranged along the Y direction. That is, a first lower second-potential-level power supply wiring extending on the first array of the logic cells (logic elements) of 35a-35c; a second lower second-potential-level power supply wiring extending on the second array of the logic cells (logic elements) of 35d-35k; a third lower second-potential-level power supply wiring 37 (See FIG. 5) extending on the third array of the logic cells (logic elements) of 35l-35o; and a fourth lower second-potential-level power supply wiring extending on the fourth array of the logic cells (logic elements) of 35p-35s are arranged along the Y direction.

The lower second-potential-level power supply wirings of the first wiring level accomplish a layout which is easy to supply second-potential-level power VSS to each of the n channel IGFETs implementing the logic cells (logic elements) of 35a-35c; 35d-35k; 35l-35o and 35p-35s. The second-potential-level power VSS may be a reference voltage, or the ground of the circuit. For example, 0V can be practically used.

A plurality of subject first-potential-level power supply wirings 51-54 of the fifth wiring level, each of which extending along the X direction on the corresponding lower first-potential-level power supply wiring of the first wiring level, in the identical position of the corresponding lower first-potential-level power supply wiring, are arranged along the Y direction. In short, the arrangement pitch of the subject first-potential-level power supply wirings 51-54 of the fifth wiring level is identical to the arrangement pitch of the lower first-potential-level power supply wirings of the first wiring level. The subject first-potential-level power supply wirings 51-54 of the fifth wiring level are established as the most upper wiring level, being formed by the same structure and material as the lower first-potential-level power supply wirings of the first wiring level.

As shown in FIG. 4, the subject first-potential-level power supply wiring 53 of the fifth wiring level is electrically connected with the lower first-potential-level power supply wiring 36 of the first wiring level through the first stacked-vias 163, 164. The first stacked-via 163 is made, stacking a lowest via-plug 41a of the second wiring level, a middle via-plug 42a of the third wiring level and an upper via-plug 43a of the fourth wiring level in this order at an identical position in a plan view. Similarly, the first stacked-via 164 is made, stacking a lowest via-plug 41b of the second wiring level, a middle via-plug 42b of the third wiring level and an upper via-plug 43b of the fourth wiring level in this order at an identical position in a plan view. As shown in FIG. 11, the other first stacked-vias 161, 162, 164-165, . . . have also the composite structure of triple levels.

As shown in FIG. 5, the low power supply wiring 57 of the fourth wiring level is electrically connected with the lower second-potential-level power supply wiring 37 of the first wiring level through the second stacked-vias 173, 174. The second stacked-via 173 is made, stacking a lower via-plug 41c of the second wiring level and an upper via-plug 42c of the third wiring level in this order at an identical position in a plan view. Similarly, the second stacked-via 174 is made, stacking a lower via-plug 41d of the second wiring level and an upper via-plug 42d of the third wiring level in this order at an identical position in a plan view. As shown in FIG. 7, the other second stacked-vias 171, 172, 174-175, . . . shown in FIG. 11 have also the composite structure of double levels.

Though illustration is omitted to avoid cluttering up the drawing, the other wirings arranged in the first wiring level except the lower first-potential-level power supply wiring 36, the other wirings arranged in the second wiring level except the via-plugs 41a-41d and the other wirings arranged in the third wiring level except the via-plugs 42a-42d are used for miscellaneous signal wirings and clock signal wirings configured to connect electrically in the space between macrocells, if another macrocell is placed other than the macrocell 30, between the macrocell 30 the logic cells (logic elements) 35a-35c; 35d-35k; 35l-35o and 35p-35s and between the macrocell 30 and the logic cells (logic elements) 35a-35c; 35d-35k; 35l-35o and 35p-35s, etc. And an interlevel between the first and third wiring levels is electrically connected by via-plugs of the second wiring level.

Though, in the first embodiment, the subject first-potential-level power supply wirings 51-54 of the fifth wiring level and the subject second-potential-level power supply wirings 55-58 of the fourth wiring level can be formed by Cu or Cu alloy, each via-plug implementing the first stacked-vias 161-165 are fundamentally formed by the same structure and material as those of the lower first-potential-level power supply wiring 36 of the first wiring level or, the subject first-potential-level power supply wirings 51-54 of the fifth wiring level. Similarly, each via-plug implementing the second stacked-vias 171-175 are fundamentally formed by the same structure and material as those of the lower second-potential-level power supply wirings of the first wiring level or the subject second-potential-level power supply wirings 55-58 of the fourth wiring level.

<Another Example of Semiconductor Integrated Circuit>

Figure 12:
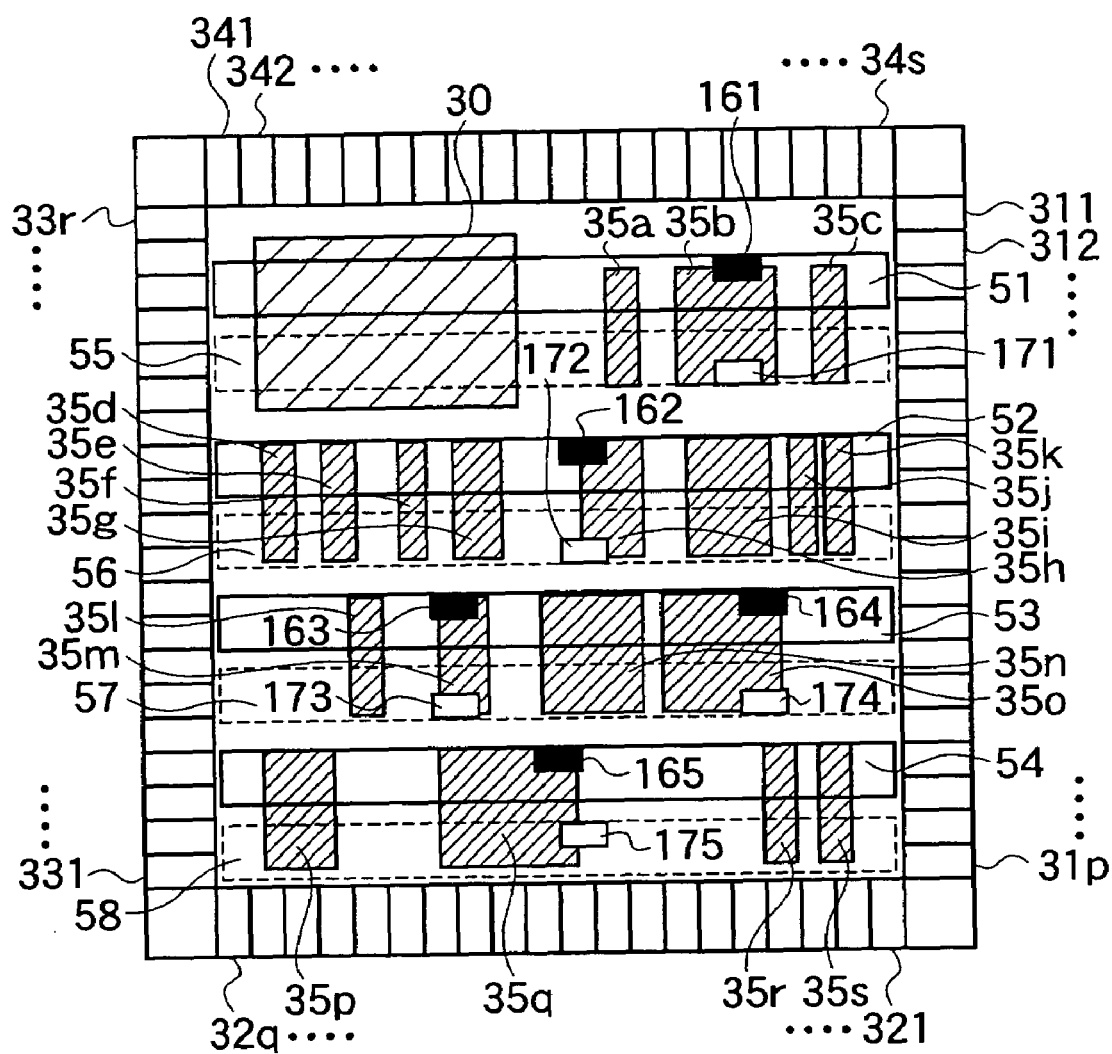
FIG. 12 is a plan view of a modification (another example) of a semiconductor integrated circuit of the first embodiment, illustrating a layout of stacked-vias, logic cells, wider subject/lower first-potential-level power supply wirings and wider subject/lower second-potential-level power supply wirings placed in the logic element arrangement region.

Still, as shown in FIG. 12, there is a case in which power supply can be carried out by placing relatively wide subject first-potential-level power supply wirings (high-potential power supply wirings) (VDD) 51-54 and relatively wide subject second-potential-level power supply wirings (low-potential power supply wirings) (VSS) 55-58 substantially on the arrays of the logic elements 35a-35c; 35d-35k; 35l-35o and 35p-35s. That is, first subject first-potential-level power supply wirings (VDD) 51 and first subject second-potential-level power supply wirings (VSS) 55 are placed respectively on horizontal lanes in the neighborhood of the central line of the first array of the logic cells (logic elements) of 35a-35c; second subject first-potential-level power supply wirings (VDD) 52 and second subject second-potential-level power supply wirings (VSS) 56 are placed respectively on horizontal lanes in the neighborhood of the central line of the second array of the logic cells (logic elements) of 35d-35k; third subject first-potential-level power supply wirings (VDD) 53 and third subject second-potential-level power supply wirings (VSS) 57 are placed respectively on horizontal lanes in the neighborhood of the central line of the third array of the logic cells (logic elements) of 35l-35o; and fourth subject first-potential-level power supply wirings (VDD) 54 and fourth subject second-potential-level power supply wirings (VSS) 58 are placed respectively on horizontal lanes in the neighborhood of the central line of the fourth array of the logic cells (logic elements) of 35p-35s. The first subject first-potential-level power supply wirings (VDD) 51 and the first subject second-potential-level power supply wirings (VSS) 55 extend over the upper area of the macrocell 30 as shown in FIG. 12. Under the subject first-potential-level power supply wirings 51-54 of the fifth wiring level, corresponding lower first-potential-level power supply wirings of the first wiring level are placed similar to the configuration shown in FIG. 4. And, under the subject second-potential-level power supply wirings 55-58 of the fourth wiring level, corresponding lower second-potential-level power supply wirings of the first wiring level is placed similar to the configuration shown in FIG. 5.

For determining allocations of vias, the various requirements stated by Eq. (3a)-(3c) and (4a)-(4d) must be considered as already discussed in the layout of FIG. 11. Then, number of the first stacked-vias 161-165 and second stacked-vias 171-175 are more placed in a densely packed area of the logic cells (logic elements) 35a-35c; 35d-35k; 35l-35o and 35p-35s, compared with a sparsely placed area of the logic cells (logic elements) 35a-35c; 35d-35k; 35l-35o and 35p-35s in FIG. 12.

<Still Another Example of Semiconductor Integrated Circuit>

Figure 13:
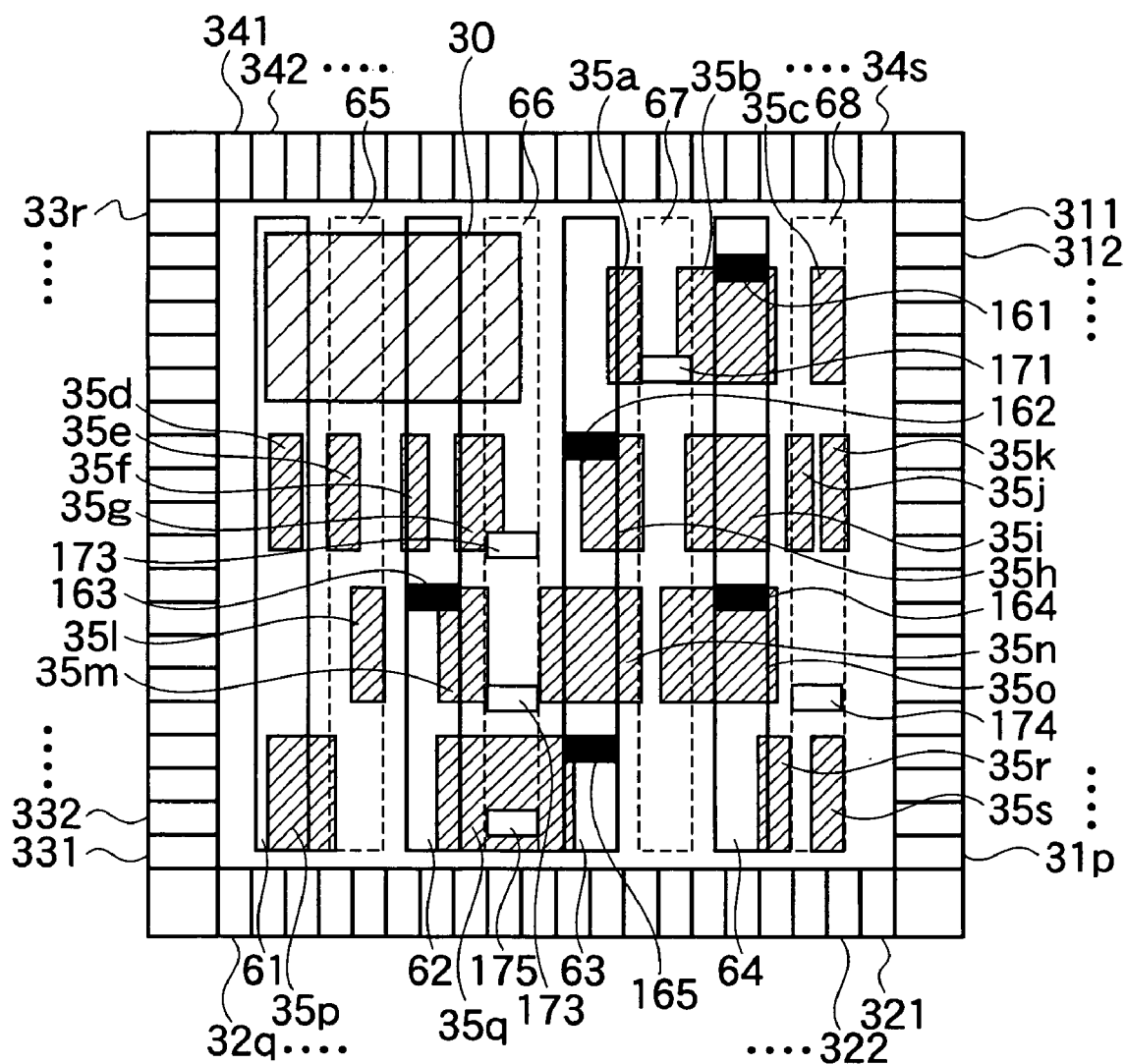
FIG. 13 is a plan view of another modification (still another example) of a semiconductor integrated circuit of the first embodiment, illustrating a layout of stacked-vias, logic cells, vertical running subject/lower first-potential-level power supply wirings and vertical running subject/lower second-potential-level power supply wirings placed in the logic element arrangement region.

And, as shown in FIG. 13, there is an architecture in which a set of subject first-potential-level power supply wirings (high-potential power supply wirings) 61-64 of the fifth wiring level and a set of subject second-potential-level power supply wirings (low-potential power supply wirings) 65-68 are placed so that the power supply wirings extend perpendicular to the horizontal arrays, where a plurality of logic elements 35a-35c; 35d-35k; 35l-35o and 35p-35s are arranged.

That is, first subject first-potential-level power supply wirings (VDD) 61 extends vertically on the logic cells 35d and 35p; first subject second-potential-level power supply wirings (VSS) 65 extends vertically on the logic cells 35e and 35l; second subject first-potential-level power supply wirings (VDD) 62 extends vertically on the logic cells 35f, 35g, 35m and 35q; second subject second-potential-level power supply wirings (VSS) 66 extends vertically on the logic cells 35g, 35m and 35q; third subject first-potential-level power supply wirings (VDD) 63 extends vertically the logic cells 35h, 35m and 35q; third subject second-potential-level power supply wirings (VSS) 67 extends vertically the logic cells 35a, 35b, 35h, 35i, 35n and 35o; fourth subject first-potential-level power supply wirings (VDD) 64 extends vertically the logic cells 35b, 35i, 35o and 35r; and fourth subject second-potential-level power supply wirings (VSS) 68 extends vertically the logic cells 35c, 35j, 35k and 35s. The first subject first-potential-level power supply wirings (VDD) 61, the first subject second-potential-level power supply wirings (VSS) 65, the second subject first-potential-level power supply wirings (VDD) 62 and the second subject second-potential-level power supply wirings (VSS) 66 extend over the upper area of the macrocell 30 as shown in FIG. 13.

Under the subject first-potential-level power supply wirings 61-64 of the fifth wiring level, corresponding vertical lower first-potential-level power supply wirings of the first wiring level are placed similar to the configuration shown in FIG. 4. And, under the subject second-potential-level power supply wirings 65-68 of the fourth wiring level, corresponding vertical lower second-potential-level power supply wirings of the first wiring level is placed similar to the configuration shown in FIG. 5.

In the perpendicular architecture shown in FIG. 13, for determining allocations of vias, the requirements stated by Eq. (3a)-(3c) and (4a)-(4d) must be considered as already discussed above. Furthermore, to determine allocations of vias in the perpendicular architecture, it must be confirmed whether a power supply wiring, which is one of the subject first-potential-level power supply wirings (VDD) 61-64 and the subject second-potential-level power supply wirings (VSS) 65-68, is lying over the location where the subject via is supposed to place. Then, similar to the layouts shown in FIGS. 11 and 12, number of the first stacked-vias 161-165 and second stacked-vias 171-175 are more placed in a densely packed area of the logic cells (logic elements) 35a-35c; 35d-35k; 35l-35o and 35p-35s, compared with a sparsely placed area of the logic cells (logic elements) 35a-35c; 35d-35k; 35l-35o and 35p-35s in FIG. 13.

Although the architecture of the first embodiment has been explained with stacked-vias, the via to be employed is not limited to the stacked-vias, and it is possible to generate and place single cut vias and/or the multi-cut vias depending on the wiring circumstances.

SECOND EMBODIMENT

Figure 14:
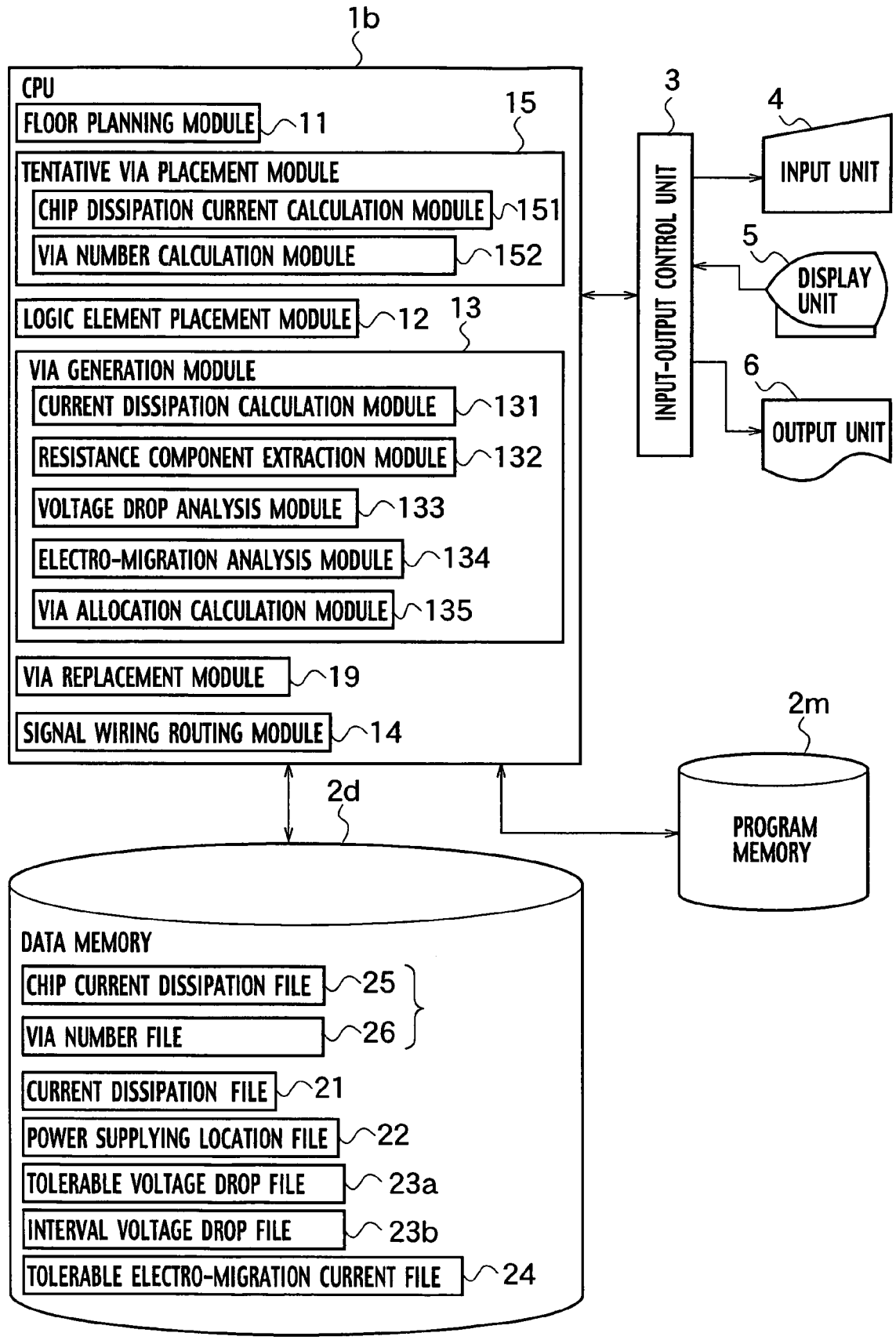
FIG. 14 is a schematic view showing an organization of a designing tool according to a second embodiment of the present invention.

As shown in FIG. 14, a designing tool according to a second embodiment of the present invention is a computer system encompassing an input unit 4 configured to accept input data and instructions from an operator, a CPU 1b configured to control and perform various operations of layout design, etc, an output unit 6 configured to provide layout results, etc. and display unit 5 configured to display input data, intermediate data and output data including the result of layout design a data memory 2d configured to store various data necessary for layout design of a semiconductor integrated circuit, etc. and a program memory 2m configured to store layout design program of a semiconductor integrated circuit, etc.

The designing tool of the second embodiment further encompasses an input/output control unit 3. Through the input/output control unit 3, the input unit 4, the output unit 6 and the display unit 5 are connected to the CPU 1b.

The CPU 1b of the designing tool according to the second embodiment has a floor-planning module 11 configured to design floorplan layout, a logic element placement module 12 configured to place logic elements, a tentative via placement module 15 configured to tentatively place a plurality of vias before pacing the logic elements, a via generation module 13 configured to generate a via at an optimum location where problems of electro-migration and voltage drop do not occur, a signal wiring routing module 14 configured to route signal wirings, and a via replacement module 19 configured to replace a layout implemented by tentatively placed inappropriate vias to a optimum layout with the optimum location, by displacing the inappropriate vias, adding a new via and/or removing the inappropriate vias.

Here, the term "via" may include various kinds of inter-level-joints such as a stacked-via, a single cut via and a multi-cut via, which are explained in the first embodiment. Then, the tentative via placement module 15 places tentative any kinds of the vias including the stacked-via, the single cut via or the multi-cut via, the via generation module 13 performs the optimization process of the coordinate of vias including the stacked-via, the single cut via or the multi-cut via, and the via replacement module 19 performs replacement process of the layout of the tentatively placed vias through a displacement process, addition process and/or removing process etc. of the stacked-via, the single cut via or the multi-cut via, which is placed tentatively by the tentative via placement module 15.

In addition to the placement of the vias, the tentative via placement module 15 places in a logic element arrangement region defined in a chip area, subject/lower first-potential-level power supply wirings (high-potential power supply wirings) and subject/lower second-potential-level power supply wirings (low-potential power supply wirings). The subject second-potential-level power supply wiring is paired with and extends in parallel with the subject first-potential-level power supply wiring, and the lower second-potential-level power supply wiring is paired with and extends in parallel with the lower first-potential-level power supply wiring.

Namely, by the tentative via placement module 15, each of the vias is tentatively placed in the subject/lower first-potential-level power supply wirings and/or the subject/lower second-potential-level power supply wirings. The logic element placement module 12 places a plurality of logic elements in the logic element arrangement region. The logic elements are placed in a different level from wiring levels in which the subject/lower first-potential-level power supply wirings and the subject/lower second-potential-level power supply wirings are established. Still, the floor-planning module 11, the tentative via placement module 15, the logic element placement module 12, the via generation module 13, the via replacement module 19 and signal wiring routing module 14 provided in the CPU 1b may be implemented by exclusive logic circuits as hardware resources, or they may be implemented by software, through a computer program.

In the already discussed designing tool of the first embodiment, in accordance with the flowchart shown in FIGS. 6A and 6B, the first stacked-vias 161-165 are placed on the first-potential-level power supply wiring side and the second stacked-vias 171-175 are placed on the second-potential-level power supply wiring side, after the placement process of the logic elements 35a-35c; 35d-35k; 35l-35o and 35p-35s. According to the architecture of the first embodiment, in the estimation of global routing, based upon geometric information of the placement of the logic elements 35a-35c; 35d-35k; 35l-35o and 35p-35s, because obstacles due to the first stacked-vias 161-165 allocated on the first-potential-level power supply wiring and the second stacked-vias 171-175 allocated on the second-potential-level power supply are not considered, a case where a wiring route is shortly estimated occurs sometimes.

Figure 17:
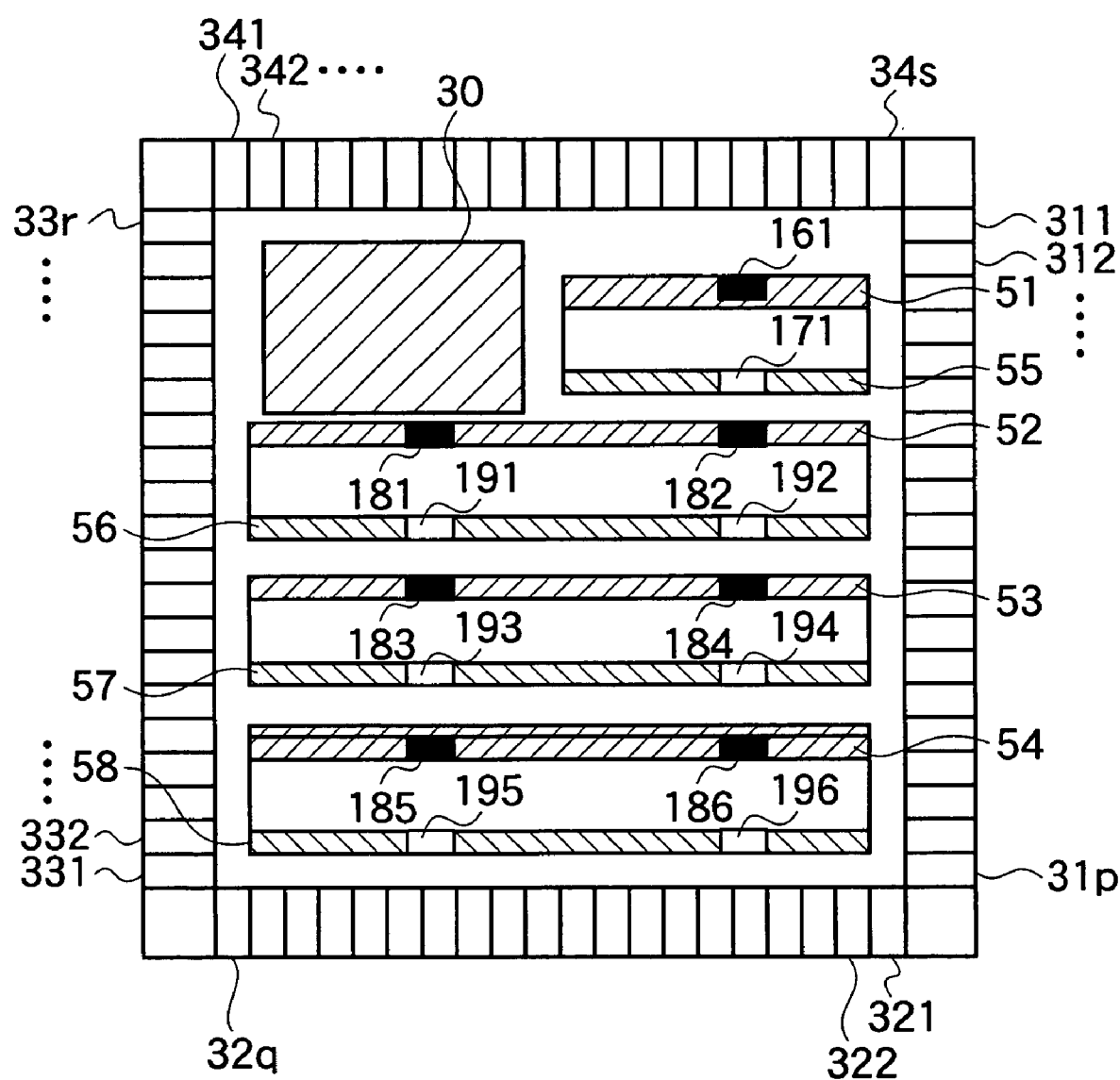
FIG. 17 is a plan view illustrating a result of a placement process, by which subject/lower first-potential-level power supply wirings, subject/lower second-potential-level power supply wirings, and stacked-vias are tentatively placed in the logic element arrangement region, in the computer-aided design method of the second embodiment.

Then, in the designing tool according to the second embodiment of the present invention, as shown in FIG. 17, before the placement process of the logic elements 35a-35c; 35d-35k; 35l-35o and 35p-35s, the tentative via placement module 15 places the first stacked-vias 161, 181-186 in the subject first-potential-level power supply wirings 51-54 and the second stacked-vias 171, 191-196 in the subject second-potential-level power supply wirings 55-58.

The tentative via placement module 15 embraces a chip dissipation current calculation module 151 configured to calculate total current dissipation of the semiconductor chip and a via number calculation module 152 configured to calculate number of the vias from the number of the logic elements on the semiconductor chip.

The via generation module 13 has the organization and function substantially similar to the via generation module 13 of the designing tool of the first embodiment, and encompasses a current dissipation calculation module 131 configured to calculate current dissipation data of the logic elements, a resistance component extraction module 132 configured to extract the resistance component of the power supply wirings, a voltage drop analysis module 133 configured to analyze the interval voltage drop and setting the tolerable voltage drop corresponding to the interval voltage drop, a electro-migration analysis module 134 configured to analyze the electro-migration, and a via allocation calculation module 135 configured to calculate and optimize the allocation of each of the vias. Although organization and function of the current dissipation calculation module 131, the resistance component extraction module 132, the voltage drop analysis module 133, the electro-migration analysis module 134 are similar to the organizations and functions already explained in the first embodiment, the via allocation calculation module 135 differs from those of first embodiment, and has organization and function for optimizing the allocation of each of the vias, which are tentatively allocated by the tentative via placement module 15.

The current dissipation calculation module 131 calculates current dissipation consumed by the logic elements in the ladder network, which is accomplished by a plurality of current paths, flowing through each of the logic elements, connected between the subject first-potential-level power supply wiring and the subject second-potential-level power supply wiring, estimates load capacitance of the logic elements from a geometric information of global routing and calculates current dissipation due to discharge and charge of the logic elements. The current dissipation calculation module 131 further calculates current dissipation due to through-currents flowing through the logic elements, from the input signals of the logic elements, through simulation. From these results, the current dissipation data of the logic elements are obtained.

The voltage drop analysis module 133 analyzes the interval voltage drop of the subject/lower first-potential-level power supply wirings from a control point to a specific position, considering performance of the logic elements, etc., setting the tolerable voltage drop corresponding to the interval voltage drop. The electro-migration analysis module 134 calculates tolerable electro-migration current from operating temperature and endurance years, operating frequency, cross section of the wirings.

The data memory 2d has a chip current dissipation file 25 which stores the total current dissipation of the semiconductor chip calculated by the semiconductor chip dissipation current calculation module 151, a via number file 26 which stores the number of the vias calculated by the via number calculation module 152, a current dissipation file 21 which stores the current dissipation data of the each logic element calculated by the current dissipation calculation module 131, a power supplying location file 22 which stores the position information of power supply, a interval voltage drop file 23b which stores the interval voltage drop determined by the voltage drop analysis module 133, a tolerable voltage drop file 23a which stores the tolerable voltage drop corresponding to the interval voltage drop and a tolerable electro-migration current file 24 which stores tolerable electro-migration current calculated by the electro-migration analysis module 134. Since "vias" includes the stacked-vias, the single cut via, the multi-cut via, the via number file 26 stores the number of allocated stacked-vias, the single vias and the multi-cut vias.

As the input unit 4, the output unit 6 and the display unit 5 shown in FIG. 14 are similar to those of the first embodiment, overlapped description would be omitted.

Though it will be more clarified in the discussion of the following computer-aided design method, according to the designing tool of the second embodiment, power supply can be accomplished to the logic elements, suppressing the deterioration of wiring efficiency to be minimum.

Figure 15:
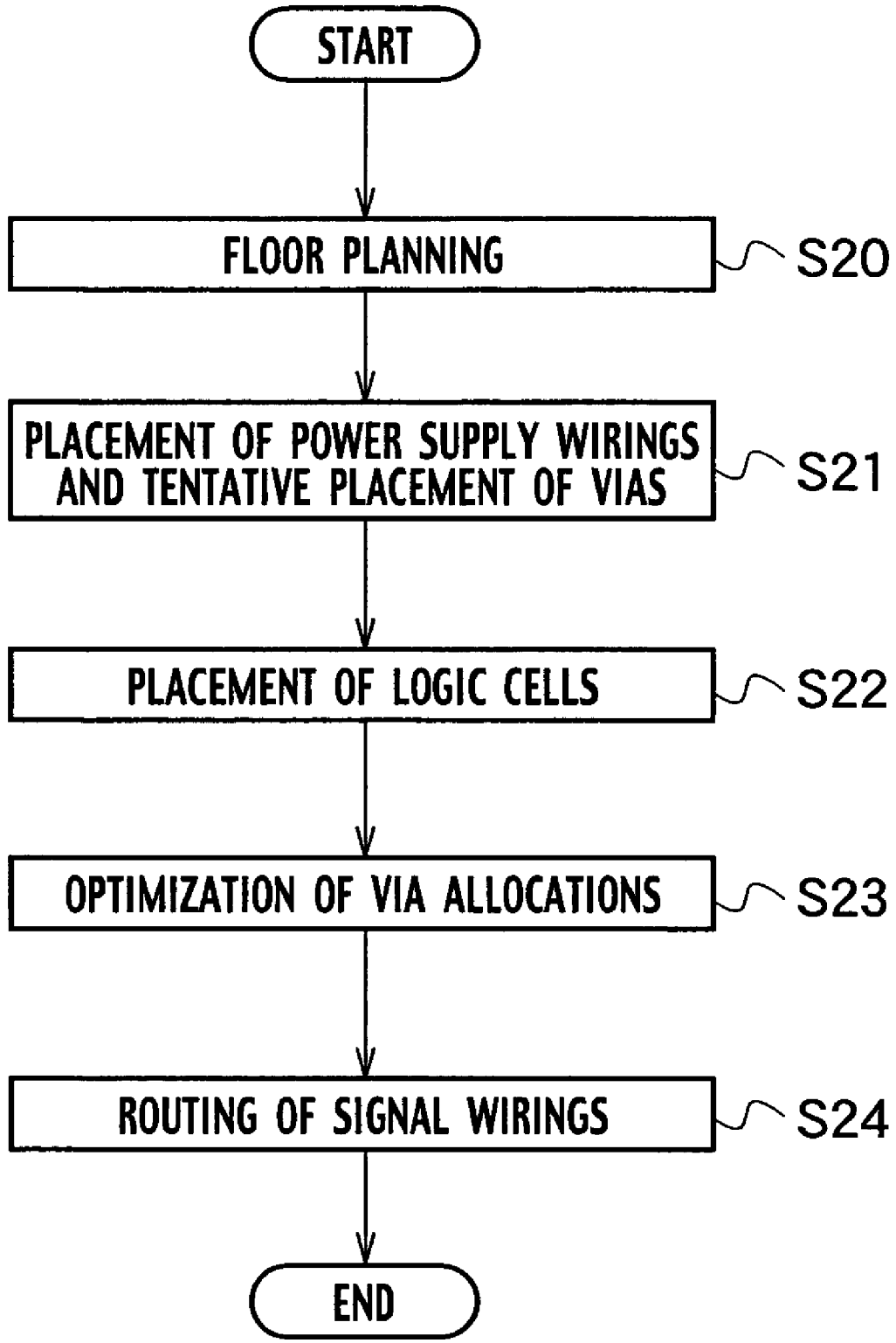
FIG. 15 is a schematic flow chart showing a sequence of processes for accomplishing a computer-aided design method according to the second embodiment of the present invention.
Figure 16:
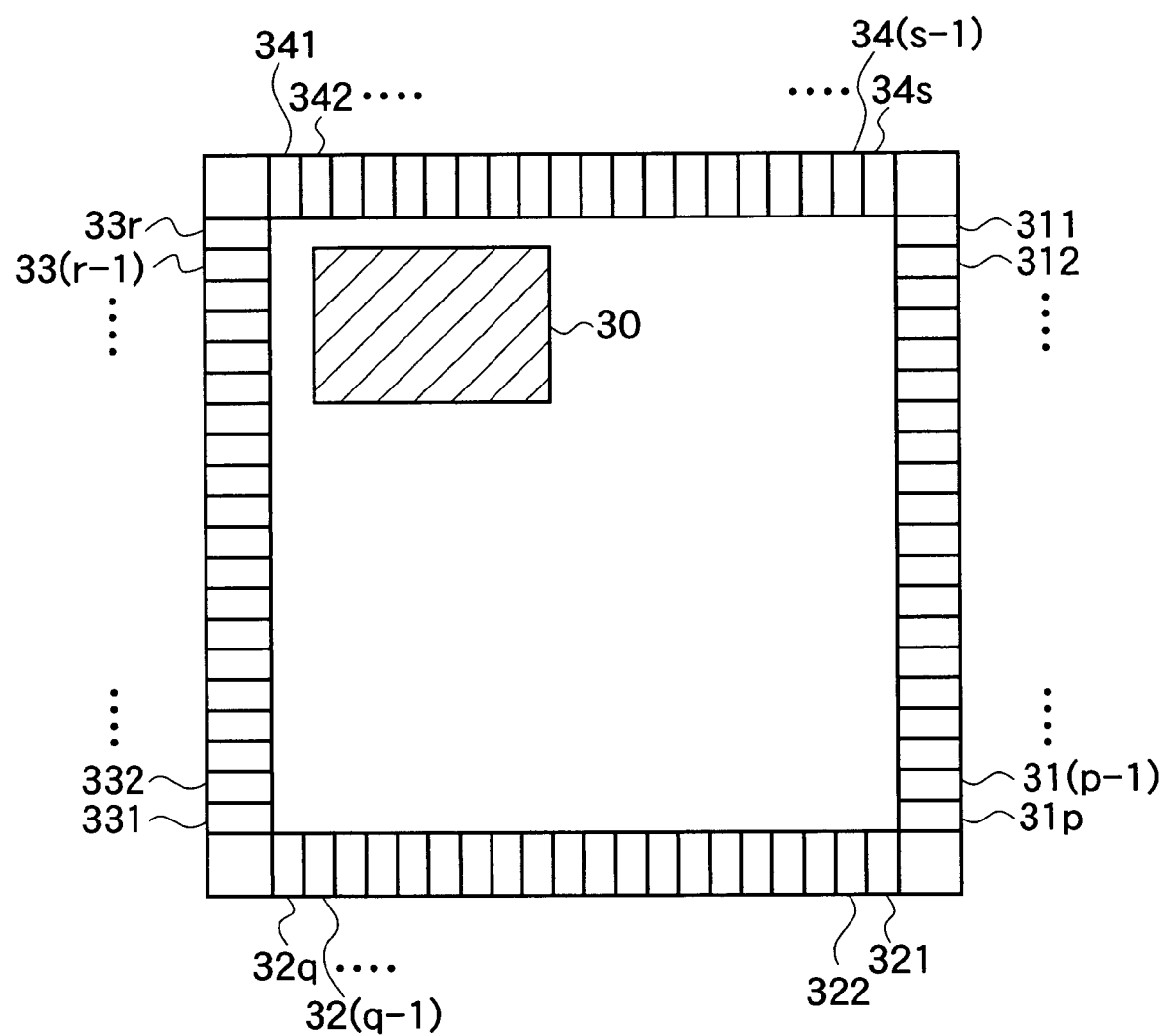
FIG. 16 is a plan view illustrating a floorplan layout in the computer-aided design method of the second embodiment, in which I/O cells are placed in peripheral zone of a chip area and a macrocell is placed at left and upper corner area of a logic element arrangement region surrounded by the I/O cells.

In FIG. 15, the flowchart of a computer-aided design method of the second embodiment is shown:

(a) First, at step S20, a floor-planning module 11 performs the task of floorplan layout as shown in FIG. 16. In the floor planning, I/O cells 311-31p, 321-32q, 331-33r, 341-34s and the macrocell 30 are placed.

(b) Next, at step S21, a tentative via placement module 15 places subject first-potential-level power supply wirings 51-54 in a subject wiring level, the subject first-potential-level power supply wirings 51-54 extends along a fixed direction in the subject wiring level. The tentative via placement module 15 further places lower first-potential-level power supply wirings in a wiring level under the subject wiring level, the lower first-potential-level power supply wirings extends along the same direction as the subject first-potential-level power supply wirings 51-54. Furthermore, the tentative via placement module 15 places subject second-potential-level power supply wirings 55-58 in second subject wiring level, being paired with and running in parallel with the subject first-potential-level power supply wirings 51-54, and lower second-potential-level power supply wirings extends along the same direction as the subject second-potential-level power supply wirings 55-58 in a wiring level under the second subject wiring level. Then, the tentative via placement module 15 estimates a number of first stacked-vias 161-165 and second stacked-vias 171-175 so as to tentatively place first stacked-vias 161-165 in the subject first-potential-level power supply wirings 51-54 and second stacked-vias 171-175 in the subject second-potential-level power supply wirings 55-58, after considering total current dissipation in the semiconductor chip and number of the logic elements scheduled to be placed on the semiconductor chip. Concretely, a chip dissipation current calculation module 151 calculates the total current dissipation in the semiconductor chip. In addition, a via number calculation module 152 calculates a number of the vias from the number of the logic elements scheduled to be placed on the semiconductor chip. In the process of step S21, since the logic elements are not placed yet, as shown in FIG. 17, they can be estimated by assuming that the logic elements are uniformly placed in the whole area of the logic element arrangement region defined in the semiconductor chip. That is to say, assuming that total current dissipation of the semiconductor chip is uniformly consumed in the whole area of the semiconductor chip, the number of the vias to be allocated are estimated as shown in FIG. 17, in order to allocate the first stacked-vias 161-165 on the subject first-potential-level power supply wirings 51-54 and the second stacked-vias 171-175 on the subject second-potential-level power supply wirings 55-58 so that the problems of voltage drop and electro-migration do not occur. The calculated total current dissipation is stored in the semiconductor chip current dissipation file 25 provided in the data memory 2d. In addition, the number of the vias calculated by the via number calculation module 152 is stored in the via number file 26 provided in the data memory 2d.

Figure 18:
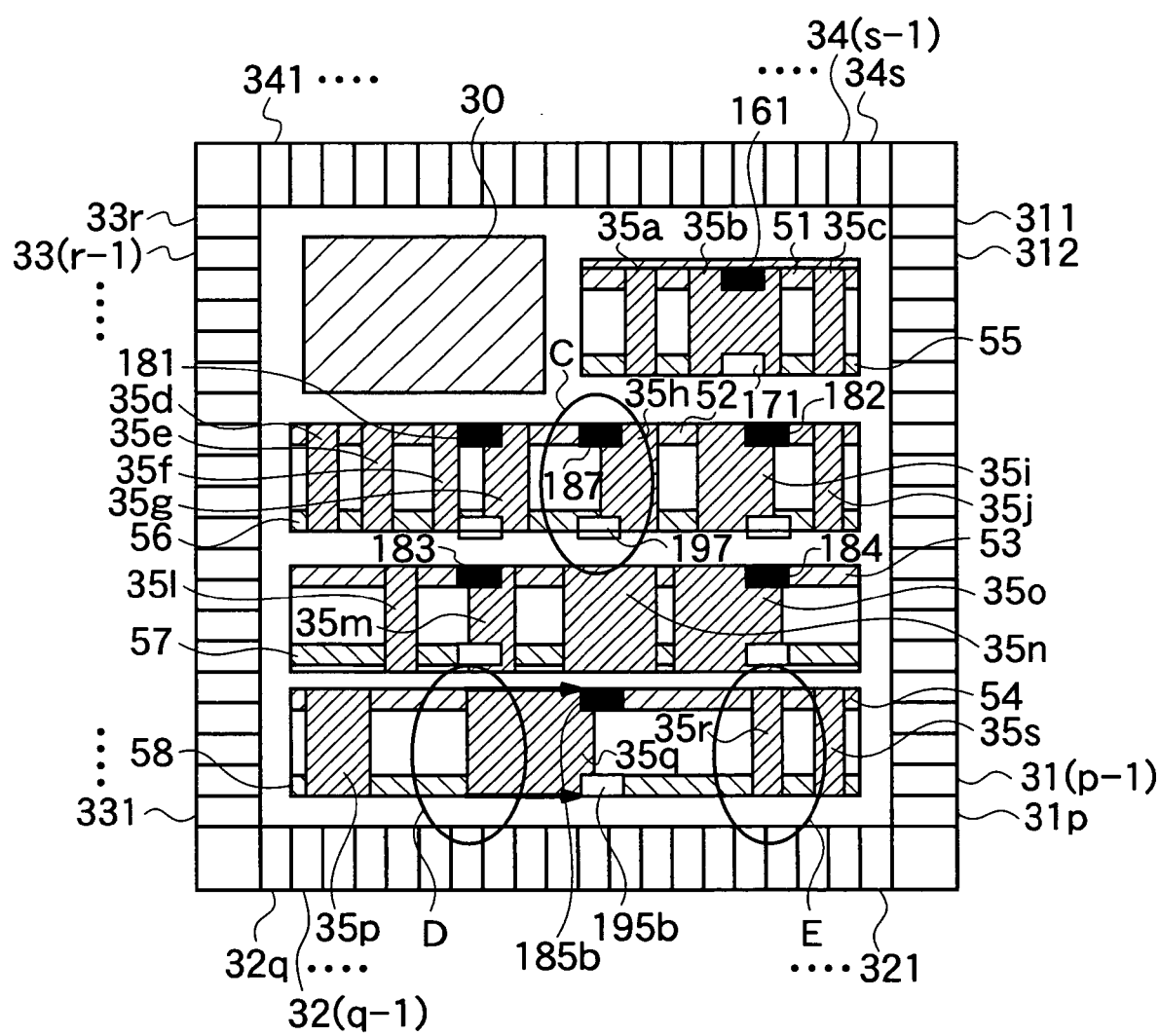
FIG. 18 is a plan view illustrating a result of a placement process for placing a plurality of logic elements, and a result of a replacement process, by which stacked-vias tentatively placed are replaced to respective optimum positions, in the computer-aided design method of the second embodiment.

(c) Then, at step S22, a plurality of logic elements 35a-35c; 35d-35k; 35l-35o and 35p-35s are placed by the logic element placement module 12 as shown in FIG. 18. Namely, a plurality of logic cells (logic elements) 35a-35c are arranged in the top horizontal row, between the subject first-potential-level power supply wiring 51 and the subject second-potential-level power supply wiring 55, a plurality of logic cells (logic elements) 35d-35k are arranged in the second horizontal row between the subject first-potential-level power supply wiring 52 and the subject second-potential-level power supply wiring 56, a plurality of logic cells (logic elements) 35l-35o are arranged in the third horizontal row from the top, between the subject first-potential-level power supply wiring 53 and the subject second-potential-level power supply wiring 57, and a plurality of logic cells (logic elements) 35p-35s are arranged in the bottom horizontal row between the subject first-potential-level power supply wiring 54 and the subject second-potential-level power supply wiring 58 in the logic element arrangement region.

(d) And in the same sequence of procedures as explained by the flowchart shown in FIGS. 6A and 6B of the first embodiment, at step S23, a via allocation calculation module 135 provided in a via generation module 13 calculates and optimizes the allocation of the stacked-via 161, 181-186 in the subject first-potential-level power supply wirings 51-54 and the stacked-via 171, 191-196 in the subject second-potential-level power supply wirings 55-58 so that the problem of voltage drop does not occur. Then, the positions of the stacked-via 185a in the subject first-potential-level power supply wiring 54 and the stacked-via 195a in the subject second-potential-level power supply wiring 58 placed at step S22 are moved by a via replacement module 19 to the respective optimum positions shown at new positions of the stacked-via 185b and the stacked-via 195b, as shown in the area encircled by a circle D in FIG. 18. And, additions of a new stacked-via 187 on the subject first-potential-level power supply wiring 52 and a new stacked-via 197 on the subject second-potential-level power supply wirings 56 is performed by the via replacement module 19 as shown in the area encircled by a circle C in FIG. 18, when the logic element 35g-35h and 35i are crowded and current-feed is insufficient. And, for a area where the logic elements are not placed much and sufficient current-feed is established, the removing process of the stacked-via 186 from the subject first-potential-level power supply wiring 54 and the stacked-via 196 from the subject second-potential-level power supply wirings 58 is performed by the via replacement module 19 as shown in the area encircled by a circle E in FIG. 18.

(e) Afterward, at step S24, the signal wiring routing module 14 routes signal wirings.

According to the computer-aided design method of the second embodiment, electro-migration immunity of the subject first-potential-level power supply wirings can be improved and voltage drop of the subject first-potential-level power supply wirings can be decreased as well as in the computer-aided design method of the first embodiment. And also high degree integration can be achieved and area usage efficiency can be improved according to the computer-aided design method of the second embodiment, similar to the computer-aided design method of the first embodiment.

In short, the real estate of the logic element arrangement region can be ensured by decreasing allocation number of the stacked-vias, serving as obstacles of the routing, in an area where the logic elements are sparsely arranged. Especially, wiring routes can be optimized, in the global routing for connecting between the logic elements 35a-35c; 35d-35k; 35l-35o and 35p-35s, because vias 161, 181-186; 171, 191-196 are tentatively placed before the placement process of the logic elements 35a-35c; 35d-35k; 35l-35o and 35p-35s, in view of the function of the stacked-vias 161, 181-186; 171, 191-196 serving as obstacles to the routing process. Therefore, integration degree of the semiconductor integrated circuit can be improved, because useless roundabout wirings or useless detours can be decreased.

Still, by controlling the computer system (the CAD tool) shown in FIG. 14, by the computer program equivalent to the algorithm shown in FIG. 15, the sequence of processes of automatic design shown in the flow of FIG. 15 can be executed. The program memory 2m in FIG. 14 may be made to store the computer program.

That is to say, the computer program product for designing an integrated circuit of the second embodiment encompasses:

(a) Instructions to the tentative via placement module 15 for placing the subject/lower first-potential-level power supply wirings and the subject/lower second-potential-level power supply wirings paired with and running in parallel with the subject/lower first-potential-level power supply wirings, and for tentatively placing a plurality of vias on the subject first-potential-level power supply wiring and the subject second-potential-level power supply wiring.

(b) Instructions to the logic element placement module 12 for placing a plurality of logic elements in a level different from the wiring levels in which the subject/lower first-potential-level power supply wirings and the subject/lower second-potential-level power supply wirings are established.

(c) Instructions to the current dissipation calculation module 131 for calculating current dissipation consumed by the logic elements by a ladder network, in which a plurality of current paths which flow through each of the logic elements, the current paths are connected between the subject first-potential-level power supply wiring and the subject second-potential-level power supply wiring, and for storing the current dissipation in the current dissipation file 21.

(d) Instructions to the electro-migration analysis module 134 for analyzing tolerable electro-migration current of the subject first-potential-level power supply wirings and for storing the tolerable electro-migration current in the tolerable electro-migration current file 24.

(e) Instructions to the voltage drop analysis module 133 for analyzing interval voltage drop of the subject first-potential-level power supply wiring from the control point to the specific position and for storing the interval voltage drop in the interval voltage drop file 23b.

(f) Instructions to the via allocation calculation module 135 for optimizing the allocation layout of the vias which are placed tentatively, comparing the total current dissipation from a control point to a specific point with the tolerable electro-migration current, and comparing the interval voltage drop with the tolerable voltage drop.

(g) Instructions to the via replacement module 19 for replacing a layout of the tentatively placed via to an optimum layout with the optimum location calculated by the via allocation calculation module 135.

And the computer program can perform a sequence of processes of computer-aided design method of the second embodiment by storing the computer program in a computer-readable recording medium and by facilitating reading out of the recording medium through the program memory 2m. Here, "computer-readable recording medium" means the various media explained in the first embodiment.

Still, in the second embodiment, the stacked-vias are employed an example, and it is-also possible that various kinds of vias such as single cut vias and multi-cut vias can be chosen and placed, according to wiring circumstance.

THIRD EMBODIMENT

Figure 19:
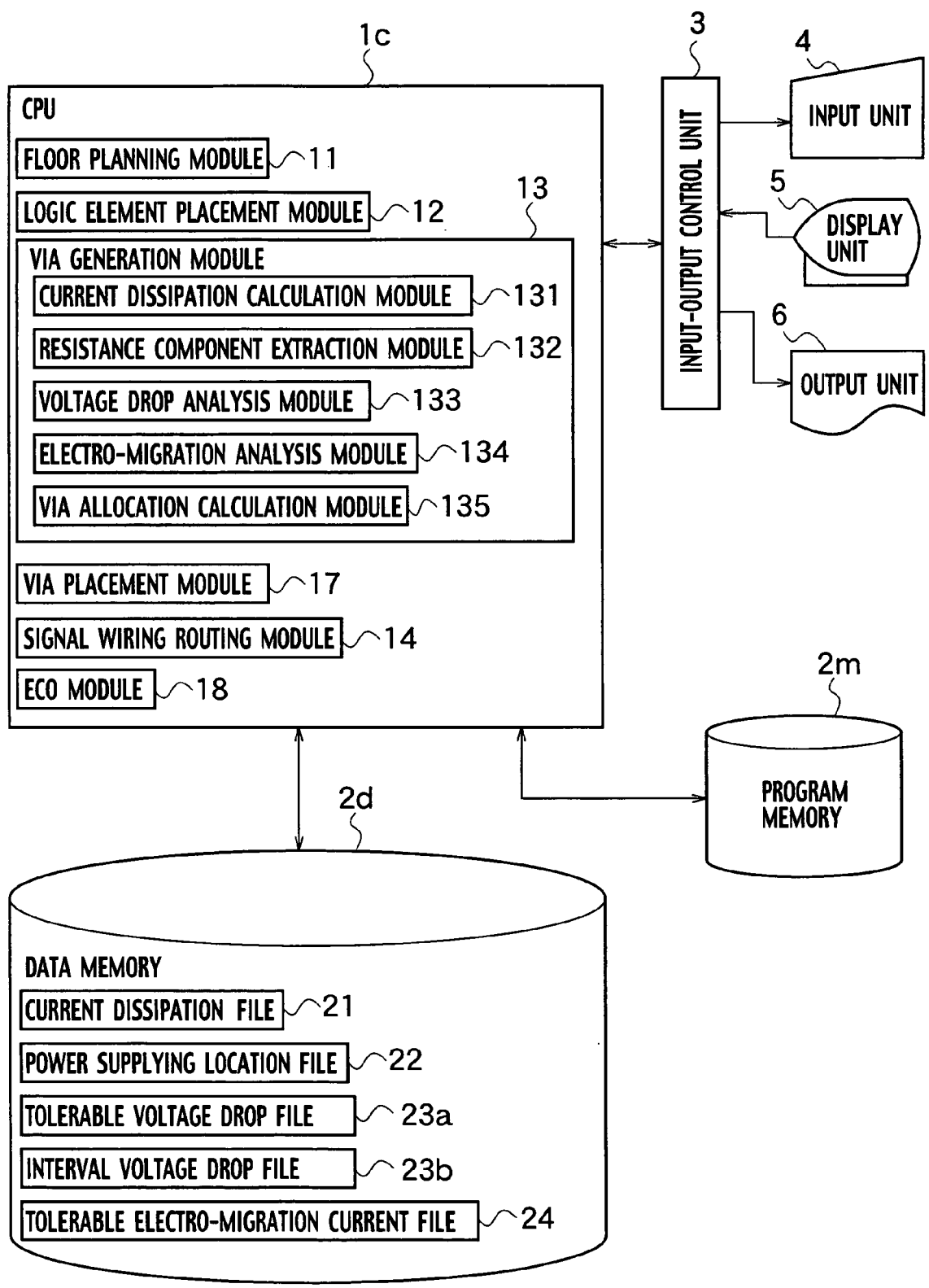
FIG. 19 is a schematic view showing an organization of a designing tool according to a third embodiment of the present invention.

As shown in FIG. 19, a designing tool according to a first embodiment of the present invention is a computer system encompassing: an input unit 4 configured to accept input data and instructions from an operator, a CPU 1c configured to control and perform various operations of layout design, etc., an output unit 6 configured to provide layout results, etc., a display unit 5 configured to display input data, intermediate data and output data including the result of layout design, a data memory 2d configured to store various data necessary for layout design of a semiconductor integrated circuit, etc. and a program memory 2m configured to store layout design program of a semiconductor integrated circuit, etc. The designing tool of the first embodiment further encompasses an input/output control unit 3. Through the input/output control unit 3, the input unit 4, the output unit 6 and the display unit 5 are connected to the CPU 1c.

The CPU 1c provided in the designing tool of the third embodiment differs from the CPU 1a in the CAD tool of the first embodiment in the feature that the CPU 1c has an engineering change order (ECO) module 18 in addition to the floor-planning module 11, the logic element placement module 12, the via generation module 13, the signal wiring routing module 14 and the via placement module 17 explained in the CAD tool of the first embodiment. "The ECO module 18" performs various ECO process, when tasks of timing improvement and circuit change are required after the layout process was completed. Other organization and functions are similar to the organization and functions already explained in the first embodiment, and overlapping or redundant description may be omitted in the third embodiment, but it must be minded that "the via" is a concept including various kinds of interlevel-joints such as a stacked-via, a single cut via and a multi-cut via, which are already explained in the first embodiment. Then, either of the stacked-via, the single cut via, or the multi-cut via can be generated by the via generation module 13.

Although, it will be more clarified in the description of the following computer-aided design method, according to the designing tool of the third embodiment, when increase of the current dissipation is observed due to an ECO process, by which addition and/or resizing of the logic elements is performed, after the layout process has completed, in a localized area of the semiconductor chip, in a short time and without providing much effect to the already routed signal wirings and clock wirings, reinforcement process of power supply can be easily performed.

Figure 20:
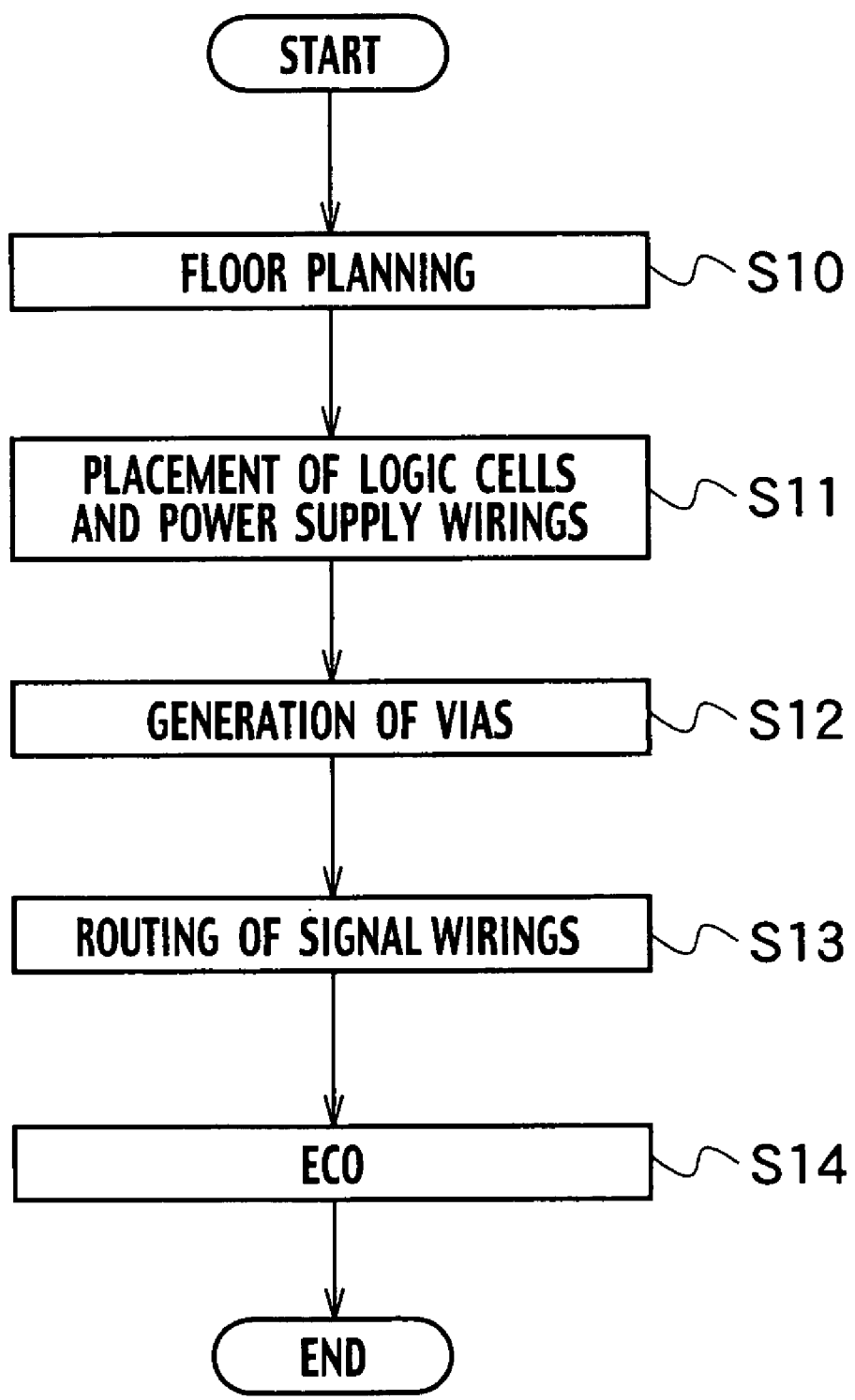
FIG. 20 is a schematic flow chart showing a sequence of processes for accomplishing a computer-aided design method according to the third embodiment of the present invention.

(a) As shown in the flowchart shown in FIG. 20, similar to the computer-aided design method of the first embodiment, a computer-aided design method of the third embodiment proceeds along a process sequence of steps S10-S13 so as to accomplish the layout design of the semiconductor integrated circuit.

(b) If additional process, such as a timing improvement process or a circuit change process, is found to be performed, after the layout process was completed at step S13, the ECO module 18 provided in CPU 1c performs the necessary ECO process at step S14. When the addition and/or resizing of the logic elements are performed in the ECO process so as to increase current dissipation in a localized area in a semiconductor chip, power supply must be reinforced so as to relax the increase of current dissipation. In the ECO process performed at step S14, through the similar methodology discussed in the first embodiment, in a localized subject area where the problems of electro-migration and voltage drop occur, so as to reinforce the power supply to the logic elements, the vias are additionally placed on the subject first-potential-level power supply wirings 51-54 or the vias are additionally placed on the second-potential-level power supply wiring. At step S14, the correction process can be performed when there is a short-circuit failure with the clock wirings and/or the signal wirings. At step S14, any kinds of vias such as the stacked-vias, a single cut via and a multi-cut via can be employed.

According to the computer-aided design method of the third embodiment, different from the mesh architecture, large effect is not given to the signal wirings and clock wirings because the addition of the wiring is not required.

FOURTH EMBODIMENT

Figure 21:
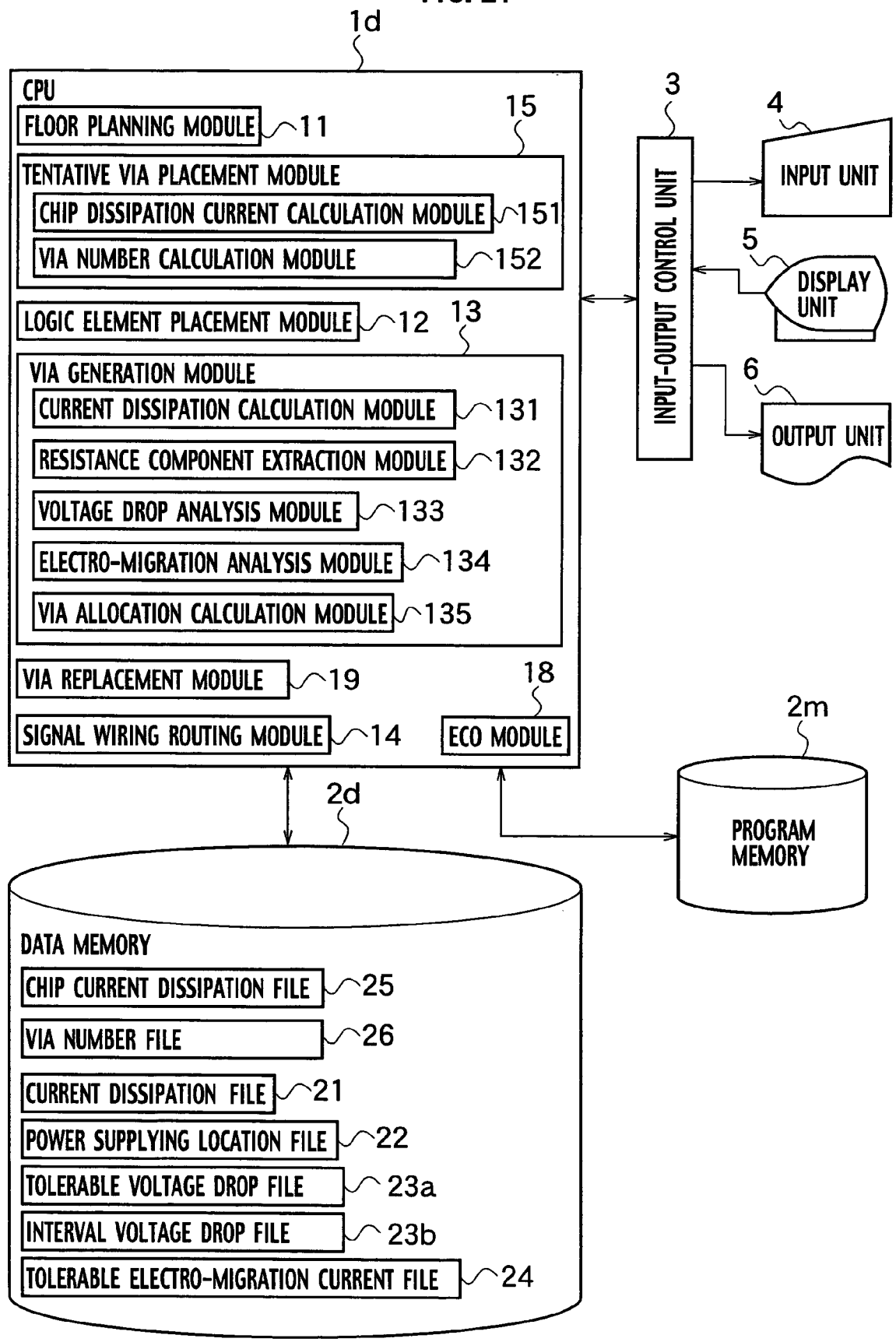
FIG. 21 is a schematic view showing an organization of a designing tool according to a fourth embodiment of the present invention.

As shown in FIG. 21, a designing tool according to a fourth embodiment of the present invention is a computer system encompassing an input unit 4 configured to accept input data and instructions from an operator, a CPU 1d configured to control and perform various operations of layout design, etc, an output unit 6 configured to provide layout results, etc. and display unit 5 configured to display input data, intermediate data and output data including the result of layout design a data memory 2d configured to store various data necessary for layout design of a semiconductor integrated circuit, etc. and a program memory 2m configured to store layout design program of a semiconductor integrated circuit, etc. The designing tool of the second embodiment further encompasses an input/output control unit 3. Through the input/output control unit 3, the input unit 4, the output unit 6 and the display unit 5 are connected to the CPU 1d.

The CPU 1d of the designing tool according to the fourth embodiment differs from the CPU 1b of the CAD tool of the second embodiment in the feature that the CPU 1d has an ECO module 18 in addition to the floor-planning module 11, the tentative via placement module 15, the logic element placement module 12, the via generation module 13, the via replacement module 19 and the signal wiring routing module 14, which are provided in the CPU 1b. The ECO module 18 performs the necessary ECO process, when timing improvement process and circuit change process are required after the layout process was completed. Other organization and functions are similar to the organization and functions already explained in the designing tool of the second embodiment, and overlapping or redundant description may be omitted in the fourth embodiment.

It will be more clarified in the discussion of the following computer-aided design method, according to the designing tool of the fourth embodiment, when current dissipation increases after ECO in a localized area of the semiconductor chip, reinforcement process of power supply is performed, in a short time and without much effect to already routed signal wirings and clock wirings.

Figure 22:
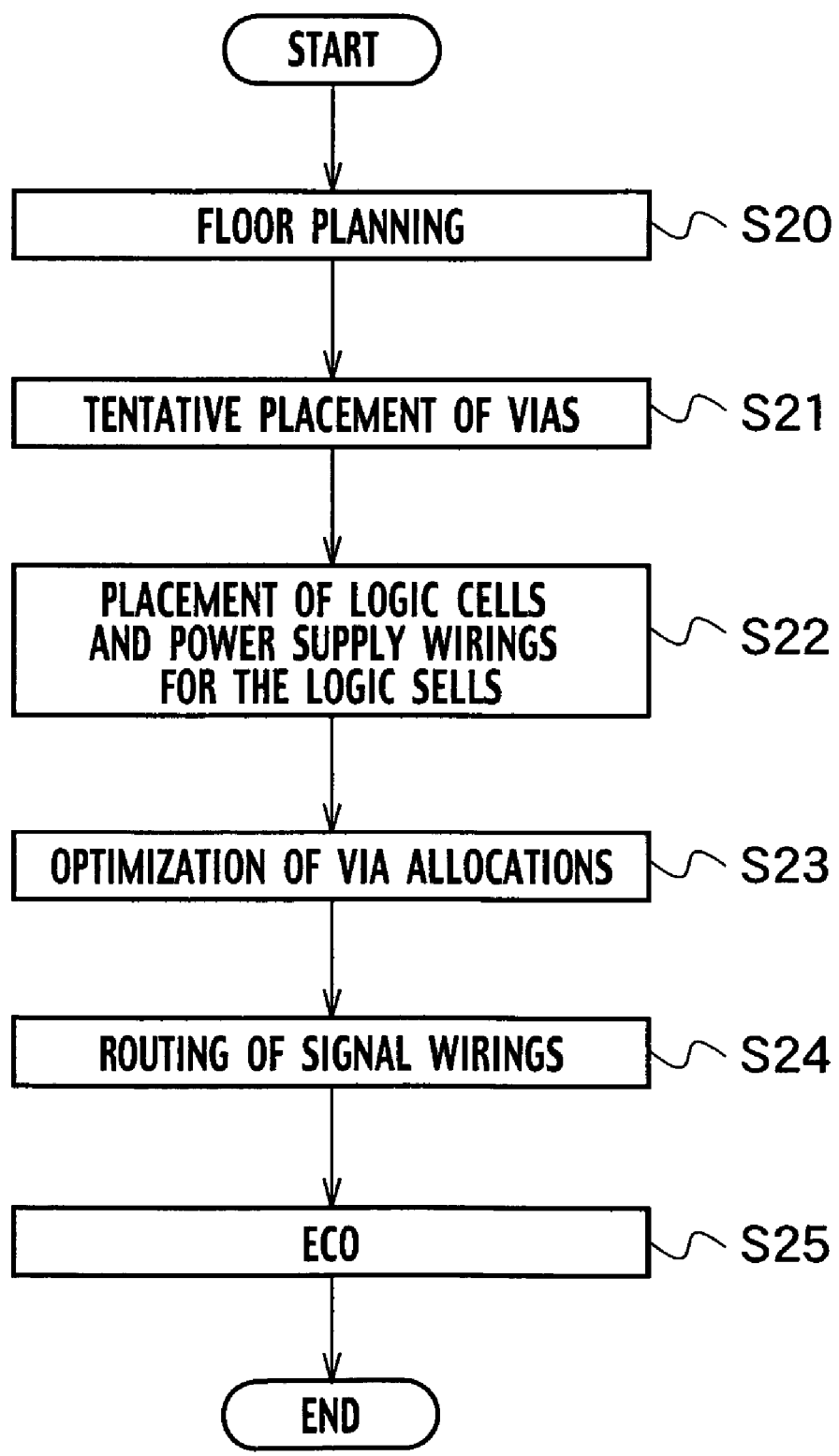
FIG. 22 is a schematic flow chart showing a sequence of processes for accomplishing a computer-aided design method according to the fourth embodiment of the present invention.

(a) As shown in the flowchart shown in FIG. 22, similar to the computer-aided design method of the second embodiment, a computer-aided design method of the fourth embodiment proceeds along a process sequence of steps S20-S24 so as to accomplish the layout design of the semiconductor integrated circuit.

(b) If an additional process, such as a timing improvement process or a circuit change process, is found to be performed, after the layout process was completed at step S24, the ECO module 18 provided in CPU 1d performs the necessary ECO process at step S24.

According to the computer-aided design method of the fourth embodiment, electro-migration immunity of the subject/lower first-potential-level power supply wirings can be improved and voltage drop of the first-potential-level power supply wiring can be decreased similar to the computer-aided design method of the first, second and third embodiments. Also high degree integration can be realized and area usage efficiency can be improved according to the computer-aided design method of the fourth embodiment as well as in the computer-aided design method of the first, second and third embodiments. That is, the real estate of the logic element arrangement region can be ensured by decreasing allocation number of the stacked-vias, serving as obstacles of the routing, in a localized area where the logic elements are sparsely arranged. Especially, when increase of the current dissipation is observed due to an ECO process, by which addition and/or resizing of the logic elements is performed, after the layout process has completed, in a localized area of the semiconductor chip, in a short time and without providing much effect to the already routed signal wirings and clock wirings, reinforcement process of power supply can be easily performed. That is to say, according to the computer-aided design method of the fourth embodiment, even if the addition process and the resize process are required by the ECO process, by which current dissipation increases in a localized area of the semiconductor chip, power supply can be reinforced without much effect to the already routed signal wirings and clock wirings. Therefore, the integration degree of the semiconductor integrated circuit can be improved, because useless roundabout wirings or useless detours can be decreased.

In the computer-aided design method of the fourth embodiment, similar to the methods of the first to third embodiments, it is possible to employ either of the stacked-via, the single via or the multi-cut via.

OTHER EMBODIMENTS

Various modifications will become possible for those skilled in the art after receiving the teaching of the present disclosure without departing from the scope thereof. For example, in the first to fourth embodiments, a configuration of the multilevel interconnection in which the subject first-potential-level power supply wirings extends in the fifth wiring level and the subject second-potential-level power supply wirings extending along the fourth wiring level is explained, but the configuration is a mere example, and the subject second-potential-level power supply wirings can extend along the fifth wiring level or sixth wiring level. That is, the second subject wiring level can take the same level with the subject wiring level, and the subject wiring level can take various levels other than the fifth wiring level.

Furthermore, in the first to fourth embodiments, the first-potential-level power supply wirings are assumed to be the high-potential power supply wirings, and the second-potential-level power supply wirings are assumed to be the low-potential power supply wirings, but the assignment of the potential levels is a mere example for convenience sake, and the first-potential-level power supply wirings can be the low-potential power supply wirings, while the second-potential-level power supply wirings become the high-potential power supply wirings. Thus, the present invention of course includes various embodiments and modifications and the like which are not detailed above. Therefore, the scope of the present invention will be defined in the following claims.

What is claimed is:

1. A computer-aided design method of multilevel interconnection including first- and second-potential-level power supply wirings for supplying power to a plurality of logic elements in an integrated circuit, the method comprising:
    calculating current dissipation consumed by the logic elements, in a ladder network comprising a plurality of current paths flowing through each of the logic elements, the current paths are connected in parallel between a subject first-potential-level power supply wiring and a subject second-potential-level power supply wiring;
    analyzing a tolerable electro-migration current of the subject first-potential-level power supply wiring;

analyzing an interval voltage drop between a control point and a specific position on the subject first-potential-level power supply wiring; and comparing a summation of through-currents flowing through the logic elements, which are arranged in a region from the control point to the specific point, with the tolerable electro-migration current, and further comparing the interval voltage drop with a tolerable voltage drop so as to determine an optimum location of a via configured to supply power from the subject first-potential-level power supply wiring to the logic elements.

2. The method of claim 1, further comprising:

placing the logic cells in the logic element arrangement region defined in a chip area of the integrated circuit;

placing the subject first-potential-level power supply wiring extending along a fixed direction in a subject wiring level different from a level in which the logic elements are placed;

placing the subject second-potential-level power supply wiring in second subject wiring level, being paired with and running in parallel with the subject first-potential-level power supply wiring, the second subject wiring level differs from the level in which the logic elements are placed; and placing the via to the optimum location.

3. The method of claim 1, further comprising:

placing the subject first-potential-level power supply wiring, and the subject second-potential-level power supply wiring being paired with and running in parallel with the subject first-potential-level power supply wiring;

tentatively placing the via on the subject first-potential-level power supply wiring;

placing the logic cells in the logic element arrangement region defined in a chip area of the integrated circuit, in a level different from the levels in which the subject first- and second-potential-level power supply wirings are placed;

calculating the optimum location of the via; and replacing a layout of the tentatively placed via to an optimum layout with the optimum location.

4. The method of claim 3, wherein the replacing the layout is performed by displacement of the tentatively placed via.

5. The method of claim 3, wherein the replacing the layout is performed by addition of a new via.

6. The method of claim 3, further comprising comparing a lower first-potential-level power supply wiring extending along the fixed direction, disposed at a plurality of wiring levels lower than the subject first-potential-level power supply wiring, wherein the via is a stacked-via electrically configured to connect the lower first-potential-level power supply wiring with the subject first-potential-level power supply wiring, penetrating the wiring levels.

7. The method of claim 1, further comprising comparing a lower first-potential-level power supply wiring disposed under the subject first-potential-level power supply wiring, wherein the via electrically connect the lower first-potential-level power supply wiring with the subject first-potential-level power supply wiring.

8. A designing tool of an integrated circuit having a multilevel interconnection including first- and second-potential-level power supply wirings for supplying power to a plurality of logic elements, comprising:

a current dissipation calculation module configured to calculate current dissipation consumed by the logic elements, in a ladder network comprising a plurality of current paths flowing through each of the logic elements, the current paths are connected in parallel between a subject first-potential-level power supply wiring and a subject second-potential-level power supply wiring;

an electro-migration analysis module configured to analyze a tolerable electro-migration current of the subject first-potential-level power supply wiring;

a voltage drop analysis module configured to analyze an interval voltage drop between a control point and a specific position on the subject first-potential-level power supply wiring; and a via allocation calculation module configured to compare a summation of through-currents flowing through the logic elements, which are arranged in a region from the control point to the specific point, with the tolerable electro-migration current, and further compare the interval voltage drop with a tolerable voltage drop so as to calculate an optimum location of a via configured to supply power from the subject first-potential-level power supply wiring to the logic elements.

9. The tool of claim 8, further comprising a logic element placement module configured to place the logic cells in the logic element arrangement region defined in a chip area of the integrated circuit; to place the subject first-potential-level power supply wiring extending along a fixed direction in a subject wiring level different from a level in which the logic elements are placed; and to place the subject second-potential-level power supply wiring in second subject wiring level, being paired with and running in parallel with the subject first-potential-level power supply wiring, the second subject wiring level differs from the level in which the logic elements are placed.

10. The tool of claim 9, further comprising a via placement module configured to place the via to the optimum location.

11. The tool of claim 8, further comprising:

a tentative via placement module configured to place the subject first-potential-level power supply wiring and the subject second-potential-level power supply wiring being paired with and running in parallel with the subject first-potential-level power supply wiring in a chip area of the integrated circuit; and to tentatively place the via on the subject first-potential-level power supply wiring; and a logic element placement module configured to place the logic cells in the logic element arrangement region in the chip area, in a level different from the levels in which the subject first- and second-potential-level power supply wirings are placed.

12. The tool of claim 11, further comprising a via replacement module configured to replace a layout of the tentatively placed via to an optimum layout with the optimum location.

13. The tool of claim 12, wherein the via replacement module displaces the tentatively placed via to replace the layout to the optimum layout.

14. The tool of claim 12, wherein the via replacement module adds a new via to replace the layout to the optimum layout.

15. The tool of claim 8, further comprising a current dissipation file storing the current dissipation data of each logic element calculated by the current dissipation calculation module.

16. The tool of claim 8, further comprising a tolerable electro-migration current file storing the tolerable electro-migration current analyzed by the electro-migration analysis module.

17. The tool of claim 8, further comprising an interval voltage drop file storing the interval voltage drop analyzed by the voltage drop analysis module.

18. The tool of claim 8, further comprising a tolerable voltage drop file storing the tolerable voltage drop of the subject first-potential-level power supply wiring.

19. An integrated circuit, comprising:
- a plurality of logic elements merged in a semiconductor chip;
- an interlevel insulator disposed above the logic elements;
- a subject first-potential-level power supply wiring extending along a fixed direction in a subject wiring level disposed above the interlevel insulator, configured to supply power to the logic elements;
- a subject second-potential-level power supply wiring in second subject wiring level disposed above the interlevel insulator, being paired with and running in parallel with the subject first-potential-level power supply wiring; and
- a via allocated in a specific position on the subject first-potential-level power supply wiring, configured to supply the power from the subject first-potential-level power supply wiring to the logic elements, the specific position is determined such that a summation of through-currents flowing through the logic elements, which are arranged in a region from a control point to the specific point is smaller than a tolerable electro-migration current, and that an interval voltage drop of the subject first-potential-level power supply wiring from the control point to the specific point is smaller than a tolerable voltage drop.

20. The integrated circuit of claim 19, further comprising:
- a lower first-potential-level power supply wiring connected the logic elements disposed under the interlevel insulator; and
- a lower second-potential-level power supply wiring disposed under the interlevel insulator;
- wherein the via electrically connect the lower first-potential-level power supply wiring with the subject first-potential-level power supply wiring.

* * * * *